United States Patent
Govyadinov et al.

(10) Patent No.: US 11,547,998 B2
(45) Date of Patent: Jan. 10, 2023

(54) DEVICES TO MEASURE FLOW RATES WITH MOVABLE ELEMENTS

(71) Applicant: HEWLETT-PACKARD DEVELOPMENT COMPANY, L.P., Spring, TX (US)

(72) Inventors: Alexander Govyadinov, Corvallis, OR (US); Pavel Kornilovich, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 402 days.

(21) Appl. No.: 16/768,248

(22) PCT Filed: Aug. 30, 2018

(86) PCT No.: PCT/US2018/048789
§ 371 (c)(1),
(2) Date: May 29, 2020

(87) PCT Pub. No.: WO2019/156711
PCT Pub. Date: Aug. 15, 2019

(65) Prior Publication Data
US 2020/0290041 A1    Sep. 17, 2020

Related U.S. Application Data

(63) Continuation-in-part of application No. PCT/US2018/017821, filed on Feb. 12, 2018, and a
(Continued)

(51) Int. Cl.
*B01L 3/00* (2006.01)
*G01F 1/68* (2006.01)
(Continued)

(52) U.S. Cl.
CPC ..... *B01L 3/502715* (2013.01); *B01L 3/50273* (2013.01); *G01F 1/68* (2013.01);
(Continued)

(58) Field of Classification Search
None
See application file for complete search history.

(56) References Cited

U.S. PATENT DOCUMENTS 3,662,598 A    5/1972  Spencer
3,720,089 A    3/1973  Davis et al.
(Continued)

FOREIGN PATENT DOCUMENTS

WO    WO-1998056956 A8    12/1998
WO    WO-2003048728 A2    6/2003
(Continued)

OTHER PUBLICATIONS

Physics Encyclopedic Dictionary; Moscow, Soviet Encyclopedia; 1983; p. 237.
(Continued)

*Primary Examiner* — J. Christopher Ball
(74) *Attorney, Agent, or Firm* — Foley & Lardner LLP

(57) ABSTRACT

An example device includes a microfluidic channel and a movable element retained in the microfluidic channel to move from a first position to a second position by fluid flow through the microfluidic channel. The device includes a sensor to take a sensor reading to determine fluid flow through the microfluidic channel. The device includes a microfluidic pump to return the movable element from the second position to the first position. The device includes a controller to actuate the microfluidic pump and to determine a flow rate of the fluid flow through the microfluidic channel based on the sensor reading.

15 Claims, 18 Drawing Sheets

Related U.S. Application Data continuation-in-part of application No. PCT/US2018/017808, filed on Feb. 12, 2018.

(51) Int. Cl.
*G01F 1/708* (2022.01)
*G01F 25/10* (2022.01)

(52) U.S. Cl.
CPC .............. *G01F 1/708* (2013.01); *G01F 25/10* (2022.01); *B01L 2200/0647* (2013.01); *B01L 2300/0663* (2013.01); *B01L 2300/088* (2013.01); *B01L 2300/0883* (2013.01); *B01L 2400/0475* (2013.01)

(56) References Cited

U.S. PATENT DOCUMENTS

| | | |
|---|---|---|
| 3,823,610 A | 7/1974 | Fussell, Jr. |
| 3,861,210 A | 1/1975 | Griverus |
| 4,167,115 A | 9/1979 | Stoever |
| 4,429,571 A | 2/1984 | Kullmann et al. |
| 5,103,181 A | 4/1992 | Gaisford et al. |
| 5,365,326 A | 11/1994 | Chrisman et al. |
| 6,437,551 B1 | 8/2002 | Krulevitch et al. |
| 7,703,336 B2 | 4/2010 | Genosar |
| 8,598,863 B2 | 12/2013 | Cho et al. |
| 9,297,682 B1 | 3/2016 | Njamfa |
| 9,410,832 B2 | 8/2016 | Richter |
| 9,714,853 B2 | 7/2017 | Byers et al. |
| 2003/0008308 A1 | 1/2003 | Enzelberger |
| 2003/0154036 A1 | 8/2003 | Gysling et al. |
| 2005/0164158 A1 | 7/2005 | Wang |
| 2006/0272384 A1 | 12/2006 | Lewis |
| 2007/0251330 A1 | 11/2007 | Howland et al. |
| 2009/0173166 A1 | 7/2009 | Genosar |
| 2010/0155577 A1 | 6/2010 | Kiesel et al. |
| 2010/0191482 A1 | 7/2010 | Hasson |
| 2010/0273184 A1 | 10/2010 | Ludwig |
| 2014/0311912 A1 | 10/2014 | Shih et al. |
| 2016/0025535 A1 | 1/2016 | Byers |
| 2016/0139024 A1 | 5/2016 | Kim |
| 2018/0015460 A1* | 1/2018 | Sells .................. B01L 3/50273 |
| 2018/0023987 A1 | 1/2018 | Govyadinov et al. |
| 2018/0043687 A1 | 2/2018 | Govyadinov et al. |
| 2018/0120278 A1 | 5/2018 | Hoorfar et al. |
| 2018/0364143 A1 | 12/2018 | Al Ahmad |
| 2019/0151849 A1 | 5/2019 | Nielsen et al. |

FOREIGN PATENT DOCUMENTS

| | | |
|---|---|---|
| WO | WO-2010065868 A3 | 6/2010 |
| WO | WO-2016116535 A1 | 7/2016 |
| WO | WO-2017052625 A1 | 3/2017 |
| WO | WO-2017184187 A1 | 10/2017 |

OTHER PUBLICATIONS

Arattano, M. et al., Measurements of Debris Flow Velocity Through Cross-correlation of Instrumentation Data, Jan. 25, 2005, Natural Hazards and Earth System Sciences (2005) 5: 137-142.

Kohler, J. et al., Generation of Microfluidic Flow Using an Optically Assembled and Magnetically Driven Microrotor, Nov. 24, 2014, J. Phys. D: Appl. Phys. 47 (2014) 505501 (8pp).

Lyu, L. et al., Mechanism of the Intermittent Motion of Two-phase Debris Flows, Sep. 20, 2016; Environ Fluid Mech (2017) 17:139-158.

\* cited by examiner

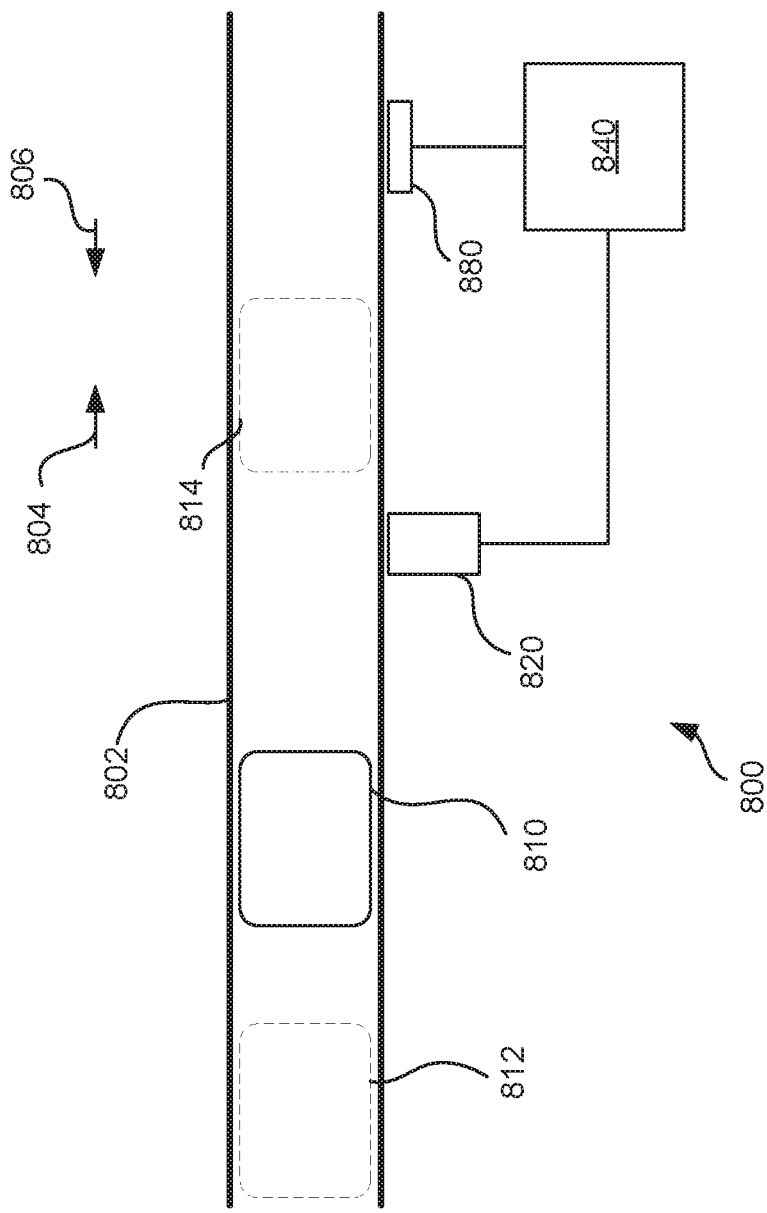

DEVICES TO MEASURE FLOW RATES WITH MOVABLE ELEMENTS

BACKGROUND

Microfluidics involves the manipulation of fluids constrained within small volumes. Such fluids may be moved through small channels, chambers, or other small components. Flow rates of such fluids may be measured by various flow meters.

Measurement of microfluidic flow rates is useful for various applications of microfluidics, such as inkjet printing, nucleic acid testing and amplification, and similar applications where accurate delivery of a fluid over time is expected.

BRIEF DESCRIPTION OF THE DRAWINGS

FIG. 8 is a schematic diagram of another example device that measures flow rate using a movable element, the device an additional sensor for calibration.

DETAILED DESCRIPTION

Figure 1:
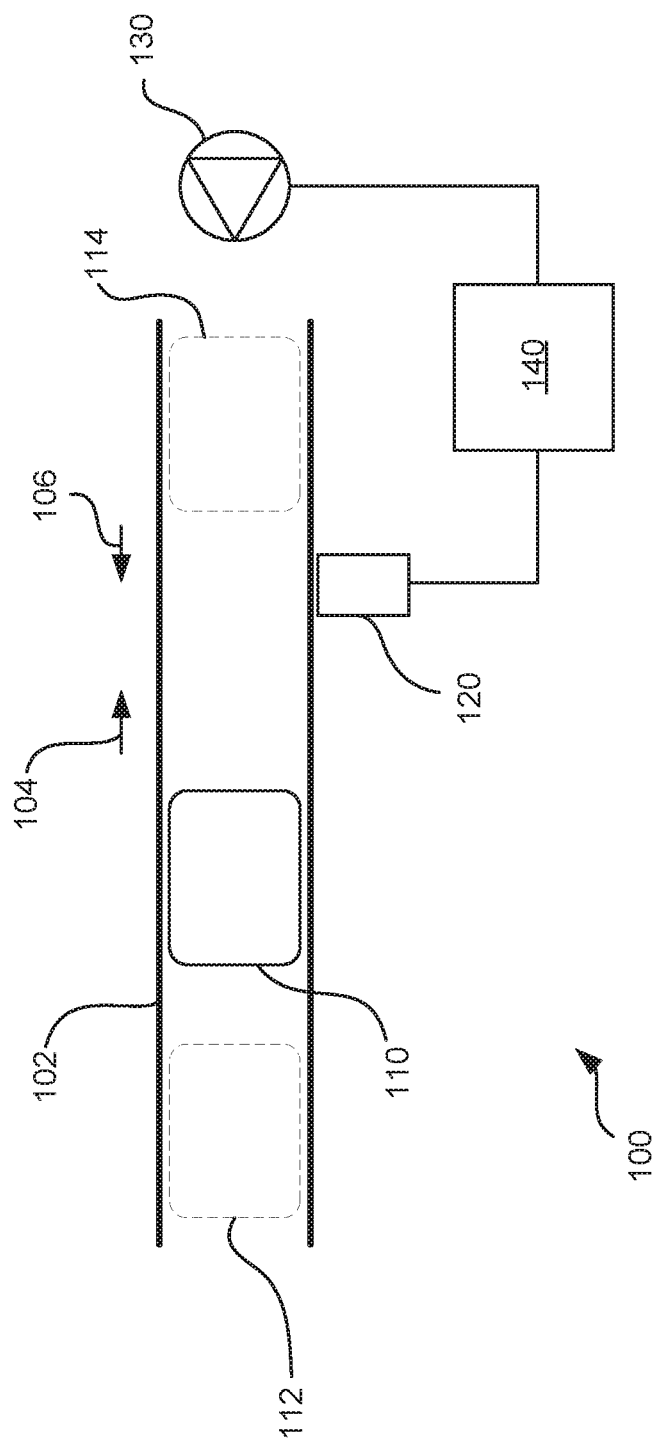
FIG. 1 is a schematic diagram of an example device that measures flow rate using a movable element.

Flow meters to measure the flow rate of a fluid moving through small channels have been developed. However, such flow meters may be sensitive to certain properties of the fluid being metered and may produce inaccurate sensor readings if not calibrated. This sensitivity may be particularly pronounced at the microfluidic scale.

For example, flow meters which operate by sensing temperatures in a fluid, which may be termed thermal flow meters, such as calorimetric flow meters and hot wire flow meters, may produce different sensor readings when measuring the flow rate of a first fluid with a first set of physical properties versus the flow rate of a second fluid with a second set of physical properties. Similarly, thermal flow meters may produce different sensor readings when measuring the flow rate of a fluid at one bulk temperature versus the flow rate of the same fluid at a different bulk temperature. Differences in viscosity, low versus high flow rate, and other characteristics of the fluid may also impact sensor readings. However, the movement of a movable element through a microfluidic channel may be less sensitive to changes in fluid characteristics. Thus, taking a sensor reading of movement of a movable element through a microfluidic channel may be used to determine fluid flow through the microfluidic channel and to calibrate other sensors which are more sensitive to fluid characteristics. Thermal flow meters, and other flow meters which may be sensitive to properties of the fluid being metered, may therefore be calibrated using devices that use movable elements to measure flow rate in a manner which is less sensitive to fluid properties.

Existing techniques for using movable elements to determine fluid flow include particle image velocimetry. In particle image velocimetry, particles are injected into a moving fluid, and movement of the particles is optically observed by an imaging device. Velocities of the particles moving through the fluid may be used to determine a flow rate of the fluid. However, the release of particles into the fluid may be invasive to the fluid. The presence of particles in the fluid may affect properties of the fluid and may interfere with operations to be carried out by the fluid. Thus, a movable element may be retained within a microfluidic channel so that the movable element is not released into the fluid, and a sensor reading of movement of the movable element may be taken to determine fluid flow to calibrate other sensors without substantially affecting properties of the fluid or interfering with operations to be carried out by the fluid. Further, a return mechanism may be used to return the movable element to a starting position so that additional calibrations may be made.

Existing flow meters using a movable element retained in a channel to measure flow rate include a flow meter which measures movement of a magnetic ball moving through a flow tube and returns the magnetic ball to a starting position using a magnetic coil. However, the use of a magnetic ball and a magnetic coil in a flow meter may be invasive to fluids which are sensitive to magnetic fields. The presence of a magnetic field may affect properties of the fluid and may interfere with operations to be carried out by the fluid. Thus, a microfluidic pump may be used to return the movable element to a starting position so that additional calibrations may be made without affecting properties of the fluid or interfering with operations to be carried out by the fluid. Further, the movable element may be retained in an auxiliary channel, and the microfluidic pump may induce fluid flow in a reverse direction through the auxiliary channel to return the movable element to its starting position, so that disturbance of other portions of the fluid is reduced.

Thus, a device which measures the flow rate of a fluid moving through a channel based on the movement of a movable element is provided. The movement of the movable element may be less sensitive to properties of the fluid, and therefore may be used to calibrate other devices measuring flow rates of the same fluid. Therefore, devices which perform microfluidic operations which are sensitive to fluid flow rates may be more precisely operated.

The device includes a microfluidic channel and a movable element retained in the microfluidic channel to move from a first position to a second position by fluid flow through the microfluidic channel. The device includes a sensor to take a sensor reading to determine fluid flow through the microfluidic channel based on movement of the movable element from the first position to the second position. The device may include a return mechanism such as a microfluidic pump to return the movable element from the second position to the first position so that an additional sensor reading may be taken.

The device includes a controller to determine a flow rate of the fluid flow through the microfluidic channel based on the sensor reading. The controller may actuate the microfluidic pump.

The device may be located at an auxiliary microfluidic channel of a microfluidic network, where the microfluidic network includes other flow rate-measuring devices to be calibrated. The movable element may be contained within the auxiliary microfluidic channel to limit disturbance to the rest of the microfluidic network. Such a device may be termed a flow meter, a calibration device, a mechanical flow meter, or a mechanical calibration device, among other terms, and may be generically referred to in this specification as a device.

FIG. 1 is a schematic diagram of an example device 100. The device 100 includes a microfluidic channel 102, which retains a movable element 110. The movable element 110 is retained to move between a first position 112 and a second position 114. The movable element 110 moves from the first position 112 to the second position 114 by fluid flow through the microfluidic channel 102 flowing in main flow direction 104. The first position 112 may therefore be termed the start position, and the second position 114 may be termed the end position.

The device 100 further includes a sensor 120, a microfluidic pump 130, and a controller 140 connected to the sensor 120 and the microfluidic pump 130.

The sensor 120 takes a sensor reading of a presence of the movable element 110 at a sensing position or a velocity of the fluid flow through the microfluidic channel 102. That is, the sensor 120 determines the presence of the movable element 110 or the velocity of the fluid flow through the microfluidic channel 102, or both. The sensor reading is used by controller 140 to determine a flow rate of fluid flow moving through the microfluidic channel 102. In some examples, the sensor 120 may be integrated into the microfluidic channel 102 or into the device 100 generally. In other examples, the sensor 120 may be external to the microfluidic channel 102 or the device 100 generally.

The sensor 120 measuring a presence of the movable element 110 at a sensing position may be used to determine a velocity of the movable element 110 moving through the microfluidic channel 102. The sensing position may be at the first position 112, the second position 114, between the first position 112 and the second position 114, or at another position along the microfluidic channel 102. For example, the movable element 110 may be initially retained at the first position 112, such as by fluid flow from the microfluidic pump 130 and stopping mechanisms (not shown) adjacent to the first position 112. The movable element 110 may be released, and the sensor 120 may detect presence of the movable element 110 at the second position 114. The time elapsed between release of the movable element 110 and detection of presence of the movable element 110 at the second position 114 may be used to determine a velocity of the movable element 110 moving through the microfluidic channel 102.

The velocity of the movable element 110 moving through the microfluidic channel 102 may be used to determine a velocity of the fluid flow through the microfluidic channel 102. For example, the velocity of the movable element 110 moving through the microfluidic channel 102 may correlate to an average velocity of the fluid flow moving through the microfluidic channel 102. Thus, the sensor 120 may generally be considered to take a sensor reading of movement of the movable element from the start position to the end position.

The movable element 110 may take on a variety of physical forms suitable to be used to measure flow rate through the microfluidic channel 102. For example, the movable element 110 may be in the shape of a rounded cylinder, as shown in side profile. It is further contemplated that the movable element 110 may be shaped like a sphere, an ellipsoid, ovoid, a rounded rectangular prism, a spherical trapezoid, a parallelepiped, a prismatic body, or any other body suitable to be used to measure flow rate through the microfluidic channel 102.

The movable element 110 may be sized to be suitable to be used to measure flow rate through the microfluidic channel 102. For example, the movable element 110 may be sized such that a velocity of the movable element 110 moving through the microfluidic channel 102 is about equal to the average velocity of the fluid flowing through the microfluidic channel 102. The movable element 110 may be sized to have a cross-section of about 50% of a cross-section of the microfluidic channel 102. Larger and smaller sizes are contemplated.

Further, the movable element 110 is made of a material which is compatible for the sensor 120 taking a sensor reading. For example, the movable element 110 may include an epoxy-based negative photoresist, such as a photo-lithographically defined pack of SU-8. If the device 100 is to be fabricated into a silicon chip, a photo-lithographically defined pack of SU-8 may be fabricated during fabrication of the device 100 to serve as the movable element 110. Other materials such as steel are contemplated. The movable element 110 may be provided in the device 100 at time of manufacture or inserted a later time.

The microfluidic pump 130 is to return the movable element 110 from the second position 114 to the first position 112 by inducing fluid flow through the microfluidic channel 102 in a reverse flow direction 106. In some examples, the microfluidic pump 130 may be integrated into the microfluidic channel 102 or the device 100 generally. In other examples, the microfluidic pump 130 may be external to the microfluidic channel 102 or the device 100 generally. In some examples, the microfluidic pump 130 may include an inertial pump, such as a thermal inkjet (TIJ) resistor-driven pump, located downstream of the movable element 110 in the main flow direction 104 as shown. In other examples, the microfluidic pump 130 may include an ejection pump, such as a TIJ ejection pump and nozzle, located upstream of the movable element 110 in the reverse flow direction 106.

The microfluidic pump 130 thereby serves as a return mechanism for the movable element 110. In other examples, the return mechanism may include another device capable of moving the movable element 110. Capability of the return mechanism to move the movable element 110 may depend on a material in the movable element 110 or another property of the movable element 110. For example, if the movable element 110 includes a magnetic material, the movable element 110 may be moved by a magnetic field. Other return mechanisms are contemplated.

In other examples, the return mechanism (e.g. the microfluidic pump 130) may be omitted when taking a single calibration reading is acceptable.

The controller 140 is to determine a flow rate of the fluid flow through the microfluidic channel 102 based on the sensor reading. Determination of the flow rate may be based on a presence of the movable element 110 at the sensing position in combination with additional information, such as a known distance travelled by the movable element 110 to reach the sensing position during fluid flow in the main flow direction 104 and known characteristics of the movable element 110 and microfluidic channel 102. Determination of the flow rate may also be based on a velocity of the movable element 110 moving through the microfluidic channel 102, or a velocity of fluid flow moving through the microfluidic channel 102. Determining the flow rate may involve determining a calibration or scaling coefficient which may be used to calibrate other flow meters. In some examples, a calibration or scaling coefficient may be determined without directly determining the flow rate.

In some examples, the controller 140 may be integrated into the microfluidic channel 102 or into the device 100 generally. In other examples, the controller 140 may be external to the microfluidic channel 102 or the device 100 generally.

The controller 140 is also to actuate the microfluidic pump 130 to return the movable element 110 from the first position 112 to the second position 114. Thus, after the sensor 120 takes a first sensor reading, the movable element 110 may be returned to its start position for a second sensor reading. The controller 140 may actuate the microfluidic pump 130 periodically or on demand. Thus, the device 100 may be used to measure flow rate periodically or on demand.

Figure 2A:
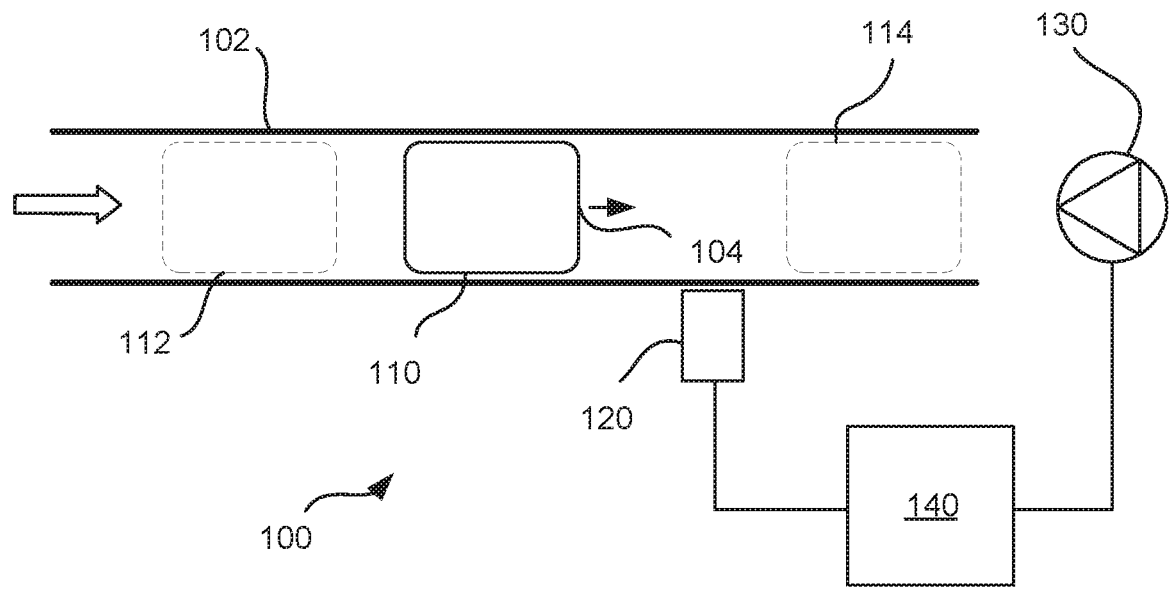
FIG. 2A is a schematic diagram of the example device of FIG. 1 showing a movable element moving in a microfluidic channel by fluid flow through the microfluidic channel.

FIG. 2A is a schematic diagram of the device 100 showing the movable element 110 moving in the microfluidic channel 102 in the main flow direction 104 by fluid flow through the microfluidic channel 102 in the main flow direction 104.

Figure 2B:
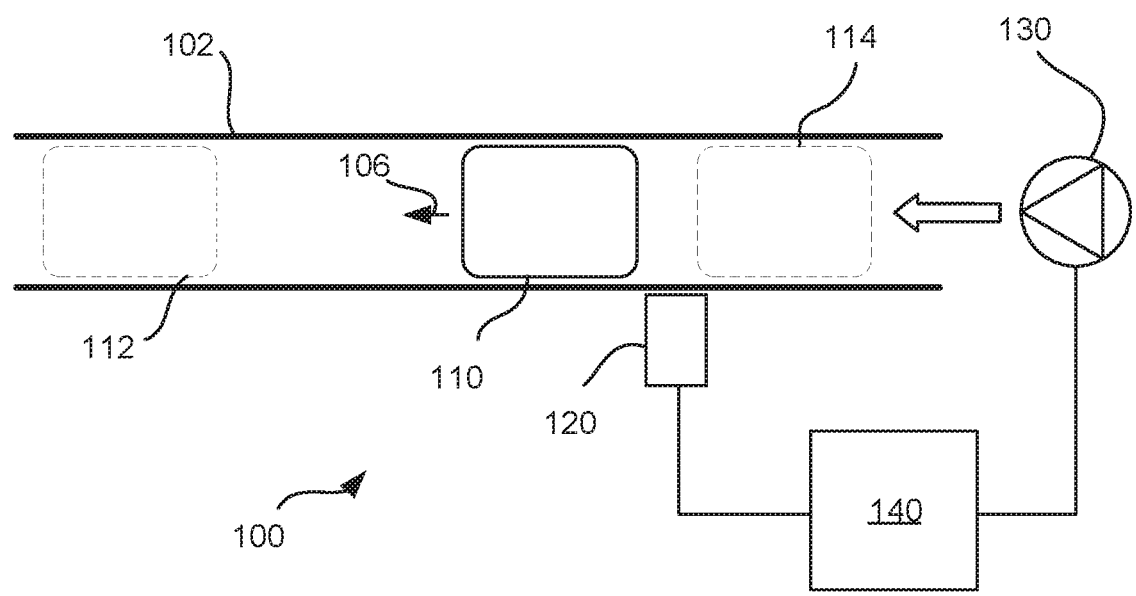
FIG. 2B is a schematic diagram of the example device of FIG. 1 showing a movable element moving in a microfluidic channel by a microfluidic pump.

FIG. 2B is a schematic diagram of the device 100 showing the movable element 110 moving in the microfluidic channel 102 in the reverse flow direction 106 by fluid flow through the microfluidic channel 102 in the reverse flow direction 106 induced by the microfluidic pump 130.

Figure 3:
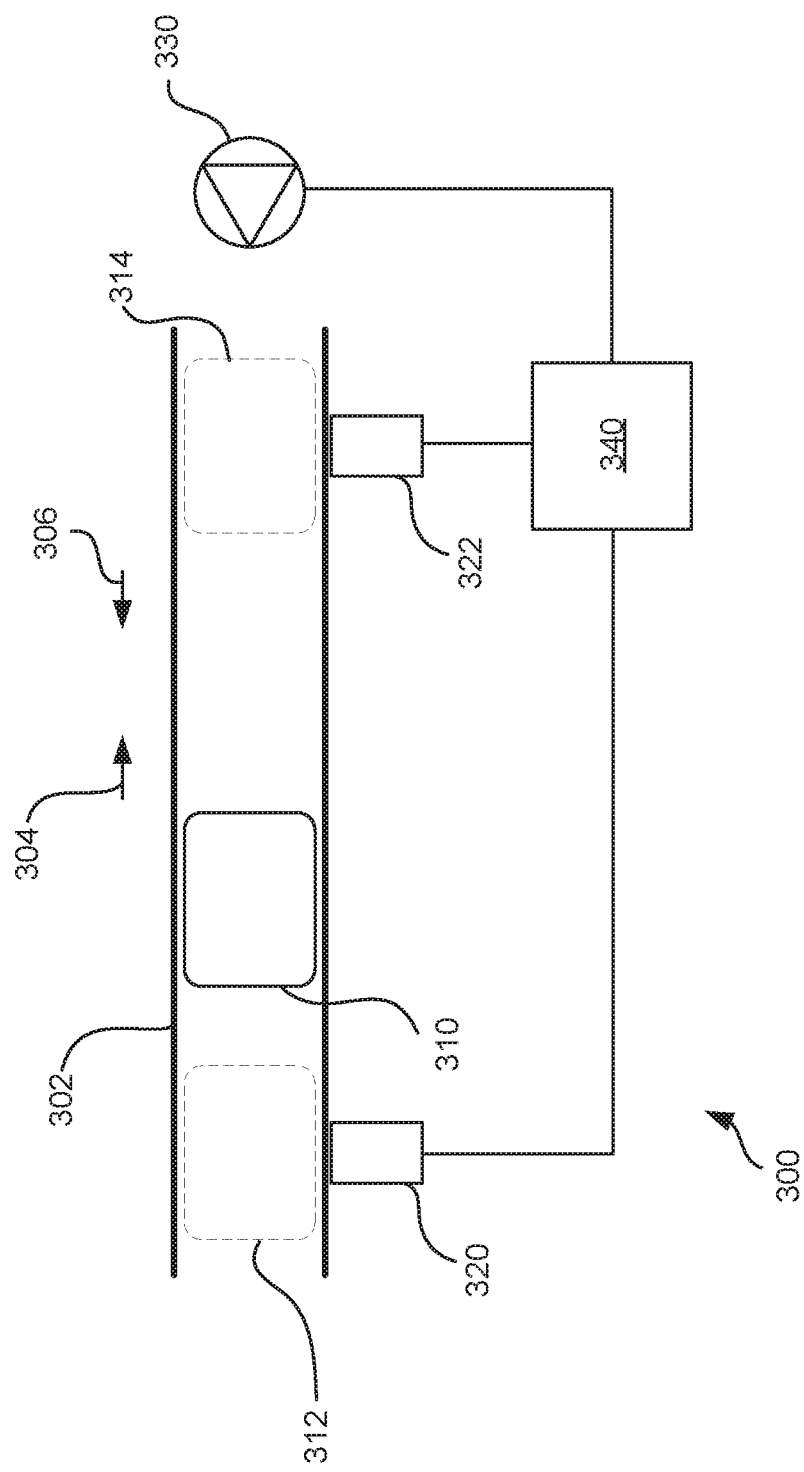
FIG. 3 is a schematic diagram of another example device that measures flow rate using a movable element, the device including two position sensors.

FIG. 3 is a schematic diagram of another example device 300 that measures flow rate using a movable element. The device 300 includes a microfluidic channel 302, a movable element 310, a first position 312, a second position 314, a main flow direction 304, a reverse flow direction 306, a sensor 320, a microfluidic pump 330, and a controller 340. For further description of the above elements of the device 300, the description of the device 100 of FIG. 1 may be referenced. For sake of clarity, only the differences between the device 300 and the device 100 will be described in detail.

The sensor 320 may include a position sensor and may be referred to herein as a first position sensor 320. The device 300 may further include a second position sensor 322. The first position sensor 320 may be to determine a presence of the movable element 310 at the first position 312, and the second position sensor 322 may be to determine a presence of the movable element 310 at the second position 314. The position sensors 320, 322 may include any type of sensor to detect a presence of the movable element 310 based on properties of the movable element 310. For example, the position sensors 320, 322 may include an electrical impedance sensor, an optical photodiode, a piezo-acoustic sensor, an inductive sensor, a magnetic sensor, a giant magnetoresistance (GMR) sensor, or another type of sensor, provided that the type of sensor is compatible with the movable element 310 such that the position sensors 320, 322 are capable of detecting a presence of the movable element 310 in the microfluidic channel 302.

The controller 340 may determine a flow rate of fluid flow through the microfluidic channel 302 using a time interval for the movable element 310 to move from the first position 312 to the second position 314 during fluid flow. Hence, the movable element 310 may be termed a tracking element. The determination may involve additional information, such as a known distance travelled by the movable element 310 between the first position 312 and second position 314, and known characteristics of the movable element 310 and microfluidic channel 302.

Figure 4A:
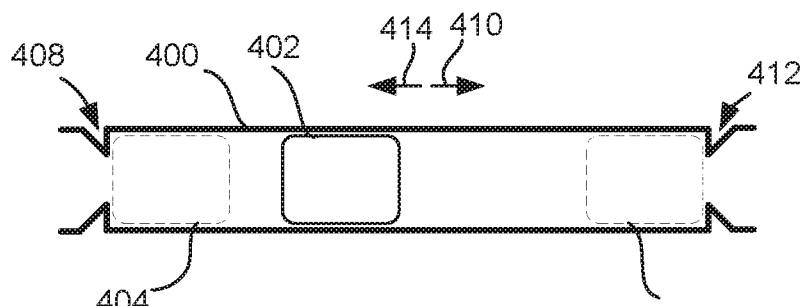
FIG. 4A is a schematic diagram of an example microfluidic channel including notch stopper elements.

FIG. 4A is a schematic diagram of an example microfluidic channel 400. The microfluidic channel 400 may be used in a device that measures flow rate using a movable element, such as those described herein.

The microfluidic channel 400 may include a first position 404 and a second position 406. The microfluidic channel 400 may further include a first stopper element 408 adjacent to the first position 404 and a second stopper element 412 adjacent to the second position 406.

The first stopper element 408 may prevent the movable element 402 from moving past the first position 404 in a main direction 410, and the second stopper element 412 may prevent the movable element 402 from moving past the second position 406 in a reverse direction 414. Thus, the first stopper element 408 and second stopper element 412 may cooperate to retain the movable element 402 in the microfluidic channel 400. In other words, the first stopper element 408 and second stopper element 412 may cooperate to bound the movable element 402 between the first position 404 and the second position 406.

The first stopper element 408 and the second stopper element 412 may include a notch in a side wall of the microfluidic channel 400 which prevents movement of the movable element 402. A notch may project inward from a side wall of the microfluidic channel 400. A notch may span a perimeter of a cross section of a side wall of the microfluidic channel 400, as shown, or may span a portion thereof. Further, a stopper element 408, 412, may include a plurality of notches.

Figure 4B:
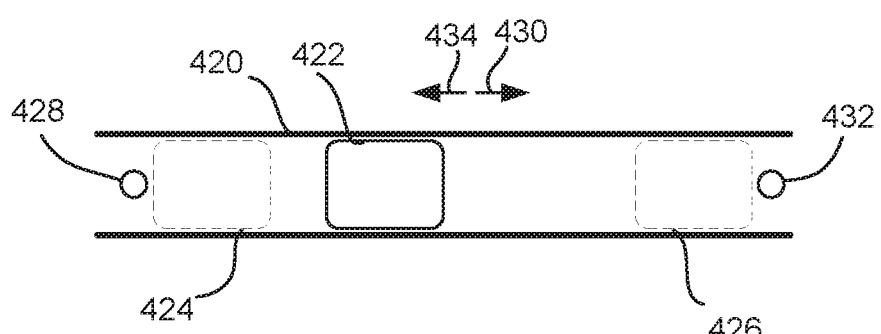
FIG. 4B is a schematic diagram of an example microfluidic channel including pillar stopper elements.

FIG. 4B is a schematic diagram of another example microfluidic channel 420. The microfluidic channel 420 may include a movable element 422, a first position 424, a second position 426, a first stopper element 428, a main direction 430, a second stopper element 432, and a reverse direction 434. For further description of the above elements of the microfluidic channel 420, the description of the microfluidic channel 420 of FIG. 4A may be referenced. For sake of clarity, only the differences between the microfluidic channel 420 and the microfluidic channel 400 will be described in detail.

The first stopper element 428 and the second stopper element 432 may include a pillar disposed in the microfluidic channel 420 which prevents movement of the movable element 422. A pillar may include a body projecting inward from a side wall of the microfluidic channel 420 to obstruct motion of the movable element 422. A stopper element 428, 432, may include a plurality of pillars.

Figure 4C:
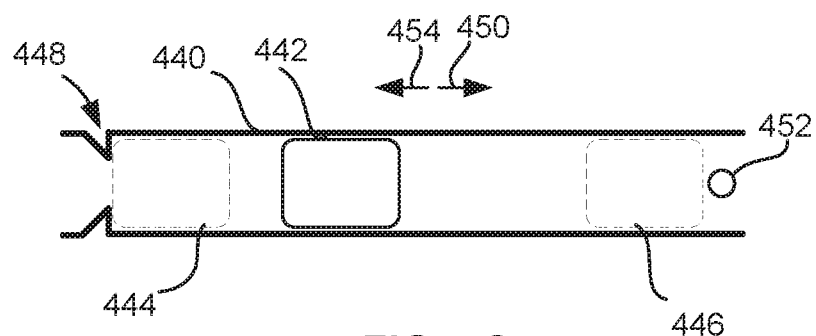
FIG. 4C is a schematic diagram of an example microfluidic channel including notch and pillar stopper elements.

FIG. 4C is a schematic diagram of another example microfluidic channel 440. The microfluidic channel 440 may include a movable element 442, a first position 444, a second position 446, a first stopper element 448, a main direction 450, a second stopper element 452, and a reverse direction 454. For further description of the above elements of the microfluidic channel 440, the description of the microfluidic channel 400 of FIG. 4A may be referenced. For sake of clarity, only the differences between the microfluidic channel 440 and the microfluidic channel 400 will be described in detail. The first stopper element 448 may include a notch, and the second stopper element 452 may include a pillar. This arrangement is not intended to be limiting. Further, additional types of stopper elements are contemplated to retain the movable element 442 in the microfluidic channel 440.

Figure 5:
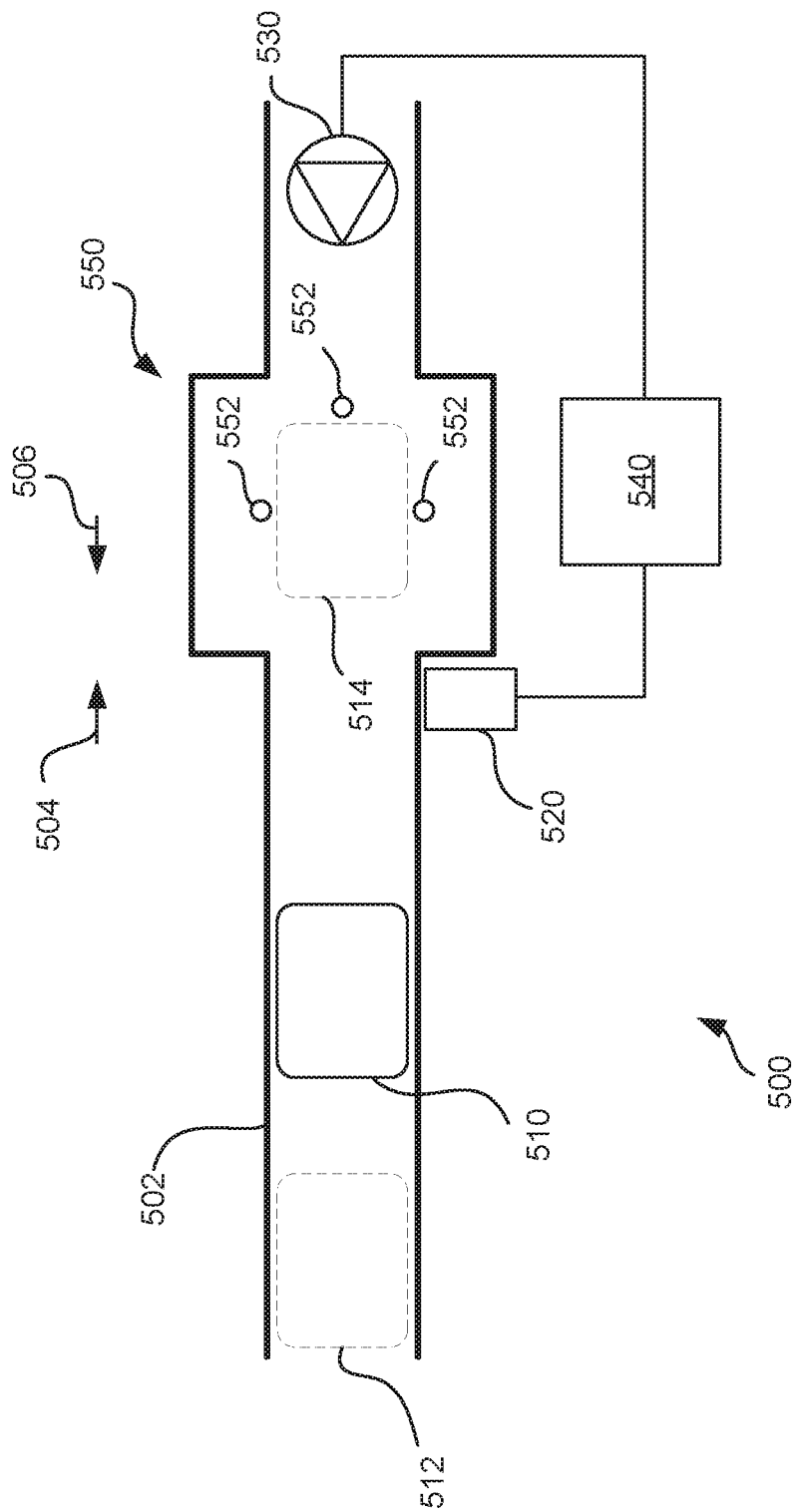
FIG. 5 is a schematic diagram of another example device that measures flow rate using a movable element, the device including a parking chamber and parking elements.

FIG. 5 is a schematic diagram of another example device 500 that measures flow rate using a movable element. The device 500 includes a microfluidic channel 502, a movable element 510, a first position 512, a second position 514, a main flow direction 504, a reverse flow direction 506, a sensor 520, a microfluidic pump 530, and a controller 540. For further description of the above elements of the device 500, the description of the device 100 of FIG. 1 may be referenced. For sake of clarity, only the differences between the device 500 and the device 100 will be described in detail.

The microfluidic channel 502 of the device 500 may further include a parking chamber 550. The second position 514 may be located in the parking chamber 550. The microfluidic channel 502 may further include parking elements 552 disposed in the parking chamber 550 to guide the movable element 510 toward the second position 514. Further, a parking element 552 may block movement of the movable element 510 from moving past the second position 514 in the main flow direction 504, thereby acting as a stopper element. Further, it is contemplated that a plurality of parking elements 552 may cooperate to guide the movable element 510 toward the second position 514 and block movement of the movable element 510 past the second position 514 in the main flow direction 504. A movable element 510 which is guided toward the second position 514 and block from moving past the second position 514 in the main flow direction 504 may be considered to be seated or parked at the second position 514.

A cross-section of the microfluidic channel 502 at the parking chamber 550 may be greater than a cross-section of the microfluidic channel 502 at the first position 512. Thus, the parking chamber 550 may provide for greater flow rate of fluid flow moving through the microfluidic channel 502 at the parking chamber 550 when the movable element 510 is parked at the second position 514. Thus, the parking elements 552 in cooperation with the greater cross-sectional area at the parking chamber 550 may allow the movable element 510 to be retained at the second position 514 while fluid is permitted to flow around the movable element 510. Thus, disturbance to the fluid flow through the microfluidic channel 502 caused by interference from the movable element 510 may be small.

Figure 6A:
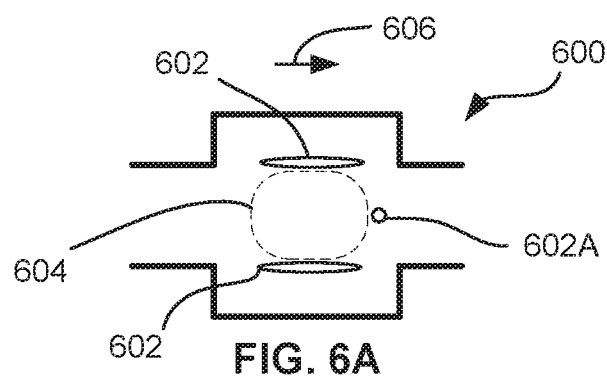
FIG. 6A is a schematic diagram of an example microfluidic channel including a parking chamber, the parking chamber including ellipsoid parking elements.

FIG. 6A is a schematic diagram of an example parking chamber 600. The parking chamber 600 may be used in a device that measures flow rate using a movable element, such as those described herein. The parking chamber 600 may include elliptic parking elements 602 to guide a movable element toward a position 604. The elliptic parking elements 602 may take a form which is elliptic in side profile. Further, an elliptic parking element 602A may serve as a stopper element to prevent the movable element from moving past the position 604 in a direction 606.

The elliptic parking elements 602 may be used to guide a movable element which is shaped as a curved rectangular prism, but this is not intended to be limiting. Thus, the position 604 is shown as an outline of a curved rectangular prism.

Figure 6B:
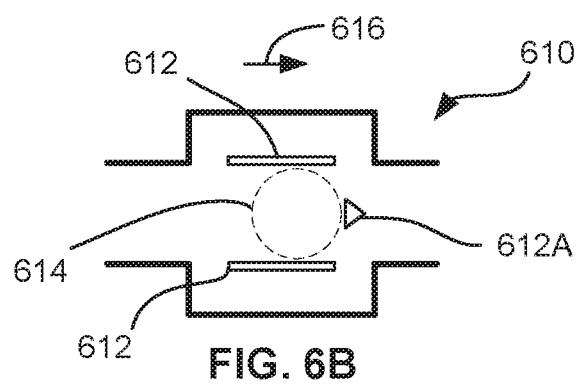
FIG. 6B is a schematic diagram of another example microfluidic channel including a parking chamber, the parking chamber including rectangular parking elements.

FIG. 6B is a schematic diagram of an example parking chamber 610. The parking chamber 610 may be used in a device that measures flow rate using a movable element, such as those described herein. The parking chamber 610 may include rectangular parking elements 612 to guide a movable element toward a position 614. The rectangular parking elements 612 may take a form which is rectangular in side profile. Further, a rectangular parking element 612A may serve as a stopper element to prevent the movable element from moving past the position 614 in a direction 616.

The rectangular parking elements 612 may be used to guide a movable element which is shaped as a sphere, but this is not intended to be limiting. Thus, the position 614 is shown as an outline of a sphere.

Figure 6C:
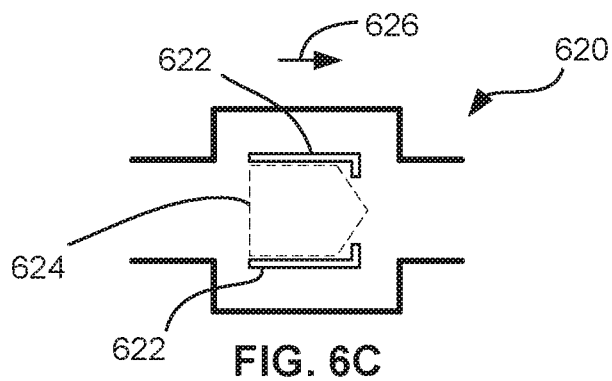
FIG. 6C is a schematic diagram of another example microfluidic channel including a parking chamber, the parking chamber including L-shaped parking elements.

FIG. 6C is a schematic diagram of an example parking chamber 620. The parking chamber 620 may be used in a device that measures flow rate using a movable element, such as those described herein. The parking chamber 620 may include L-shaped parking elements 622 to guide a movable element toward a position 624. The L-shaped parking elements 622 may take a form which is L-shaped in side profile. Further, two L-shaped parking elements 622 may serve as a stopper element to prevent the movable element from moving past the position 624 in a direction 626.

The L-shaped parking elements 622 may be used to guide a movable element which is shaped as a rectangular prism having a pointed leading end, but this is not intended to be limiting. Thus, the position 624 is shown as an outline of a rectangular prism having a pointed leading end.

Figure 6D:
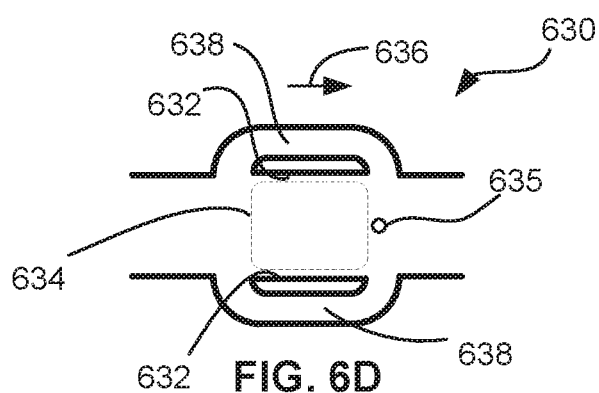
FIG. 6D is a schematic diagram of another example microfluidic channel including a parking chamber, the parking chamber including a pillar stopper element and bypass channels.

FIG. 6D is a schematic diagram of an example parking chamber 630. The parking chamber 630 may be used in a device that measures flow rate using a movable element, such as those described herein. The parking chamber 630 may include side walls 632 which serve as parking elements to guide a movable element toward a position 634. The parking chamber 630 may also include bypass channels 638 to allow fluid flow around the position 634 when a movable element is parked at the position 634. Further, the parking chamber 630 may also include a stopper element 635, such as a pillar, to prevent the movable element from moving past the position 634 in a direction 636.

The side walls 632 may be used to guide a movable element which is shaped as a pointed rectangular prism, but this is not intended to be limiting. Thus, the position 624 is shown as an outline of a pointed rectangular prism.

Figure 7:
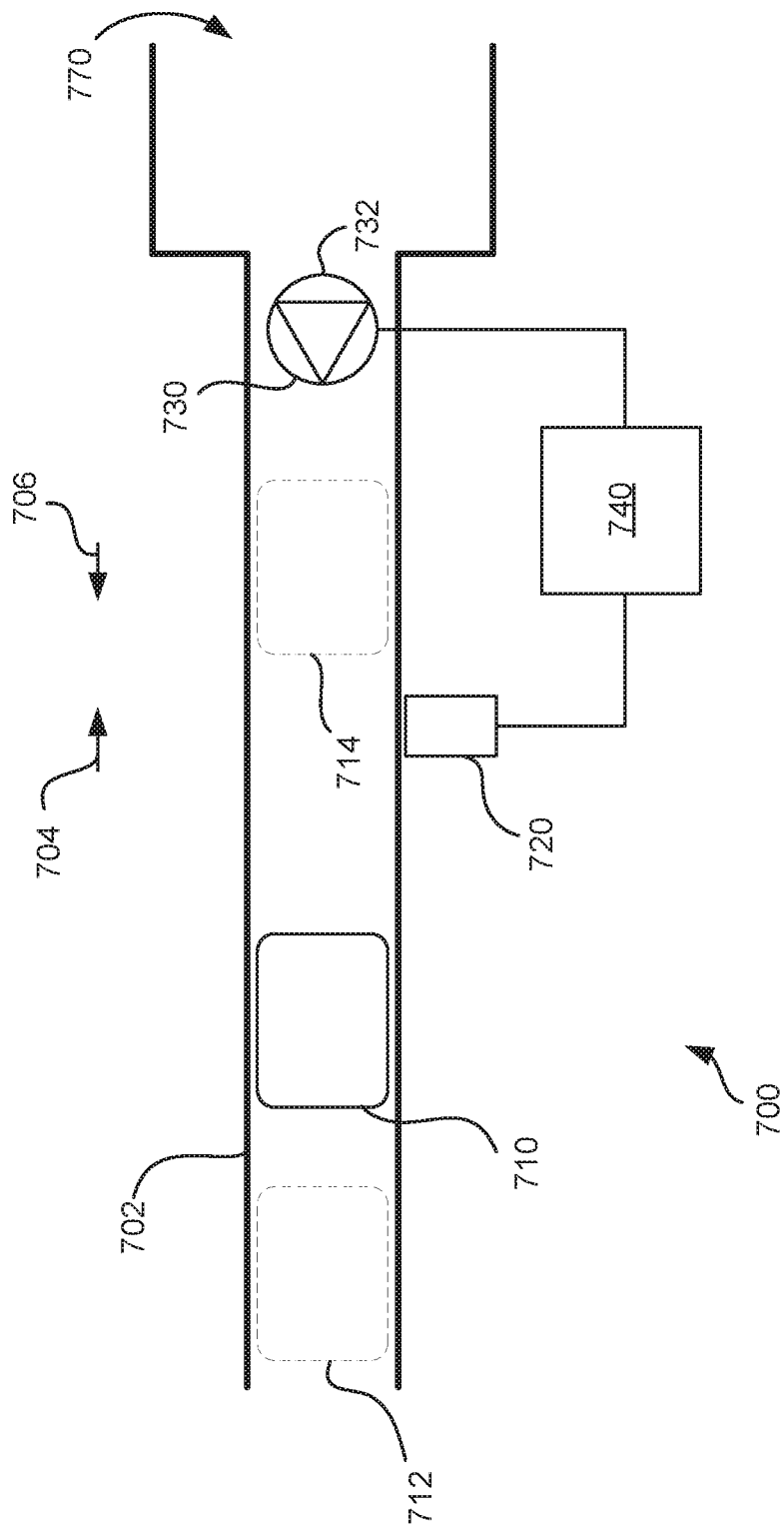
FIG. 7 is a schematic diagram of another example device that measures flow rate using a movable element, the device including a reservoir chamber.

FIG. 7 is a schematic diagram of another example device 700 that measures flow rate using a movable element. The device 700 includes a microfluidic channel 702, a movable element 710, a first position 712, a second position 714, a main flow direction 704, a reverse flow direction 706, a sensor 720, a microfluidic pump 730, and a controller 740. For further description of the above elements of the device 700, the description of the device 100 of FIG. 1 may be referenced. For sake of clarity, only the differences between the device 700 and the device 100 will be described in detail.

The microfluidic channel 702 of the device 700 may further include a reservoir chamber 770. The microfluidic pump 730 may include a rear end 732 oriented away from the first position 712 and the second position 714. The reservoir chamber 770 may be located adjacent to the rear end 732 of microfluidic pump 730. The reservoir chamber 770 may thereby enable efficient operation of the microfluidic pump 730. In examples where the microfluidic pump 730 includes an inertial pump, such as a TIJ resistor-driven pump, the reservoir chamber 770 may serve as a reservoir from which the inertial pump draws fluid enabling inertial pump operation.

FIG. 8 is a schematic diagram of another example device 800 that measures flow rate using a movable element. The device 800 includes a microfluidic channel 802, a movable element 810, a first position 812, a second position 814, a main flow direction 804, a reverse flow direction 806, a sensor 820, and a controller 840. For further description of the above elements of the device 800, the description of the device 100 of FIG. 1 may be referenced. For sake of clarity, only the differences between the device 800 and the device 100 will be described in detail.

The device 800 may include an additional sensor 880 to take an additional sensor reading to determine a flow rate of fluid flow through the microfluidic channel 802. The controller 840 may calibrate the additional sensor 880 using the flow rate based on the sensor reading taken by the sensor 820. Hence, the sensor 820 may be termed a calibrating sensor. The additional sensor 880 may be sensitive to certain properties of the fluid being metered, and may produce inaccurate sensor readings if not calibrated. This sensitivity may be particularly pronounced at the microfluidic scale. For example, the additional sensor 880 may include a thermal flow meter which may be sensitive to a temperature, viscosity, or other property of the fluid being metered. A sensor reading taken by the sensor 820 may be less influenced by properties of the fluid being metered, and therefore may be used to calibrate the additional sensor 880 for different fluids or different fluid conditions.

In some examples, the device 800 may also include return pump similar to the return pump 130 of device 100 so that an additional calibration may be performed.

Figure 9A:
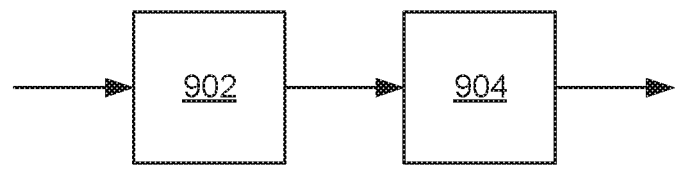
FIG. 9A is a schematic diagram of an example calibration device and a sensor to be calibrated.

FIG. 9A is a schematic diagram of an example calibration device 902 and a sensor 904 to be calibrated by the calibration device 902. The calibration device 902 may include a device that measures flow rate using a movable element, such as those described herein. The sensor 904 may include a sensor which may be sensitive to certain properties of the fluid being metered. The calibration device 902 may be less sensitive to such properties of the fluid.

The calibration device 902 may be connected to the sensor 904 in series such that a fluid may flow through the calibration device 902 and subsequently through the sensor 904. A sensor reading taken by the calibration device 902 may be used to calibrate the sensor 904 for the fluid being metered.

Figure 9B:
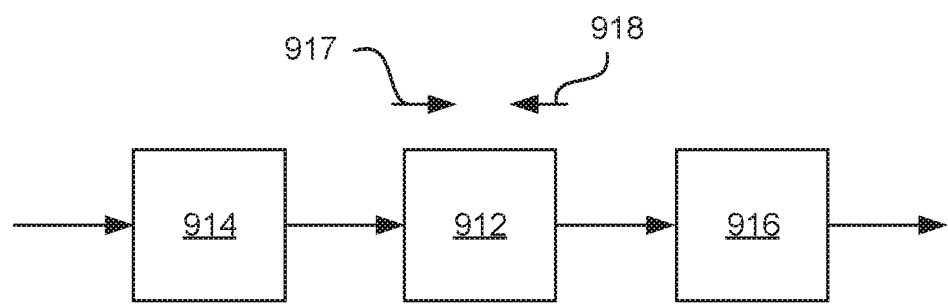
FIG. 9B is a schematic diagram of an example calibration device, a sensor to be calibrated, and a return pump, showing fluid flow in a main flow direction.

FIG. 9B is a schematic diagram of an example calibration device 912, a sensor 914 to be calibrated by the calibration device 912, and a return pump 916. Description of the calibration device 912 and sensor 914 may be had with reference to the calibration device 902 and sensor 904 of FIG. 9A.

The sensor 914 may be connected to the calibration device 912, and the calibration device 912 may be connected to the return pump 916, in series, such that a fluid may flow through the sensor 914, calibration device 912, and past return pump 916, in a main flow direction 917. A sensor reading taken by the calibration device 912 may be used to calibrate the sensor 914 for the fluid being metered. The return pump 916 may include a microfluidic pump which may be actuated to induce fluid to flow in a reverse flow direction 918.

Figure 9C:
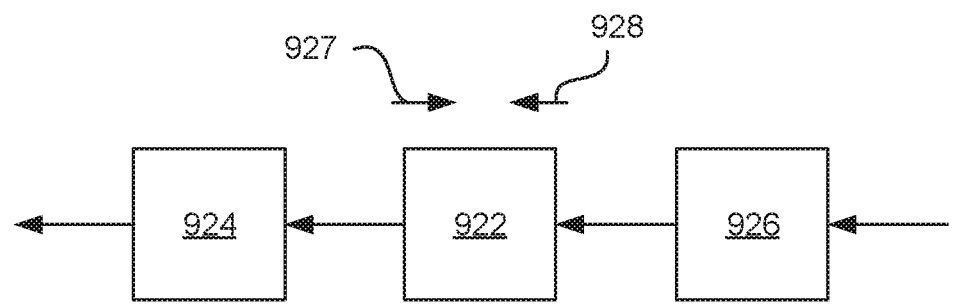
FIG. 9C is a schematic diagram of an example calibration device, a sensor to be calibrated, and a return pump, showing fluid flow in a reverse flow direction.

FIG. 9C is a schematic diagram of an example calibration device 922, a sensor 924 to be calibrated by the calibration device 922, and a return pump 926. Description of the calibration device 922 and sensor 924 may be had with reference to the calibration device 902 and sensor 904 of FIG. 9A. Description of the return pump 926 may be had with reference to the return pump 916 of FIG. 9B.

The sensor 924 may be connected to the calibration device 922, and the calibration device 922 may be connected to the return pump 926, in series, such that a fluid may flow through the return pump 926, the calibration device 922, and the sensor 924, in a reverse flow direction 928, opposite a main flow direction 927. A sensor reading taken by the calibration device 922 may be used to calibrate the sensor 924 for the fluid being metered. Thus, it may be seen that different arrangements of a calibration device, sensor to be calibrated, and return pump, are contemplated, and that a calibration device may be used to calibrate a sensor when fluid is flowing in a main direction or a reverse direction.

Figure 10:
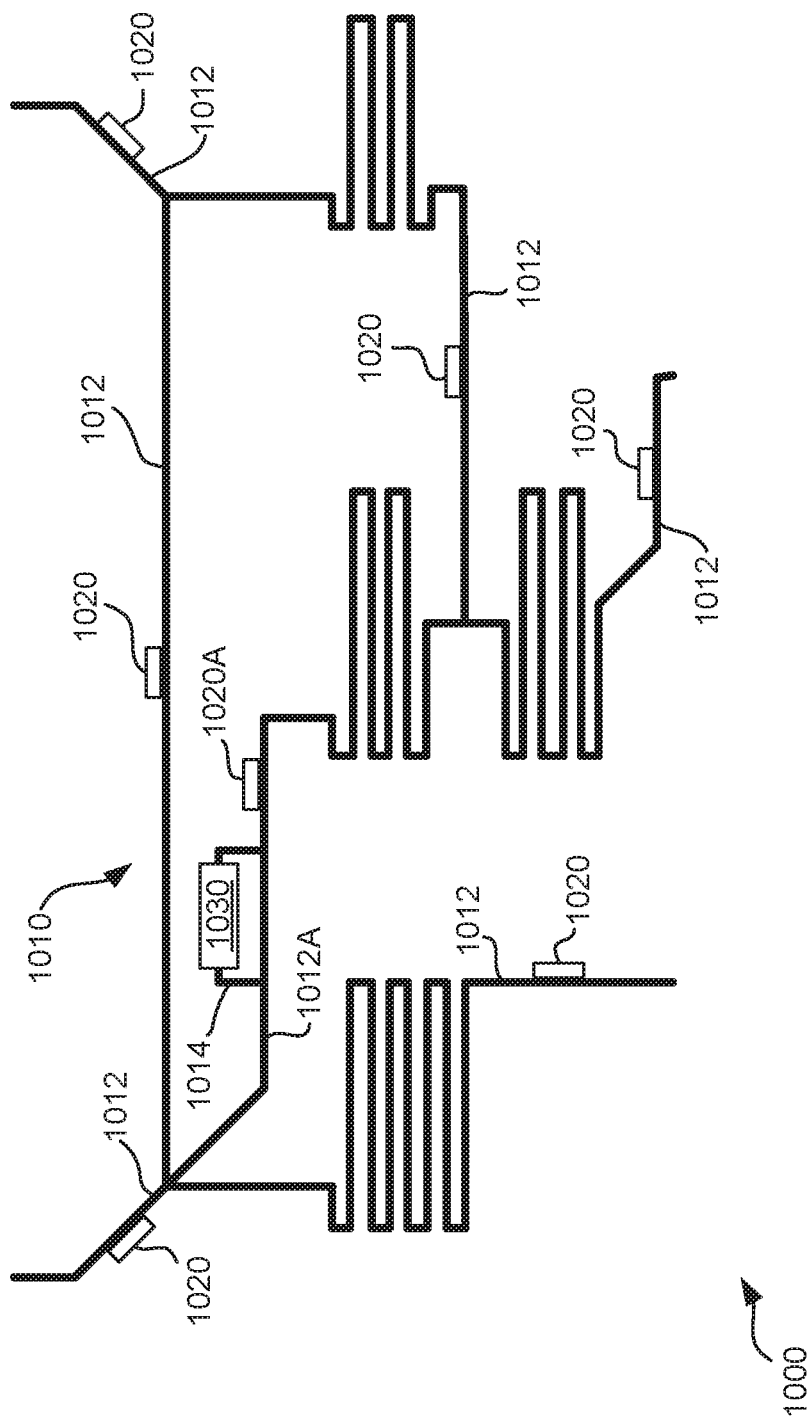
FIG. 10 is a schematic diagram of an example microfluidic device showing a microfluidic network including flow meters and an auxiliary microfluidic channel, the auxiliary microfluidic channel including a device that measures flow rate using a movable element.

FIG. 10 is a schematic diagram of an example microfluidic device 1000. The microfluidic device 1000 includes a microfluidic network 1010. The microfluidic network 1010 includes microfluidic channels 1012. The microfluidic device 1000 includes flow meters 1020 located throughout the microfluidic network 1010 to measure flow rates of fluids flowing through the microfluidic channels 1012.

The microfluidic device 1000 further includes an auxiliary microfluidic channel 1014 in fluid communication with a microfluidic channel 1012A. The auxiliary microfluidic channel 1014 may be in parallel with the microfluidic channel 1012A. A flow meter 1020A may also be located at the microfluidic channel 1012A.

The microfluidic device 1000 further includes a calibration device 1030 located at the auxiliary microfluidic channel 1014. The calibration device 1030 may include a device that measures flow rate using a movable element, such as those described herein. In some examples, the flow meter 1020A may be located in the auxiliary channel 1014 in series with the calibration device 1030.

The flow meters 1020 may be sensitive to certain properties of the fluid being metered, and may produce inaccurate sensor readings if not calibrated. This sensitivity may be particularly pronounced at the microfluidic scale. For example, the flow meters 1020 may include thermal flow meters which may be sensitive to a temperature or other property of the fluid being metered. A sensor reading taken by the calibration device 1030 may be less influenced by properties of the fluid being metered, and therefore may be used to calibrate the flow meter 1020A, and the other flow meters 1020, for different fluids or different fluid conditions. In many examples, it is contemplated that accuracy of calibration of a flow meter will be proportional to proximity of the flow meter to the calibration device, as well as whether the flow meter is in series or parallel with the calibration device. A highly accurate calibration may be realized when the calibration device is placed in close proximity to and in series with a target flow meter.

Figure 11:
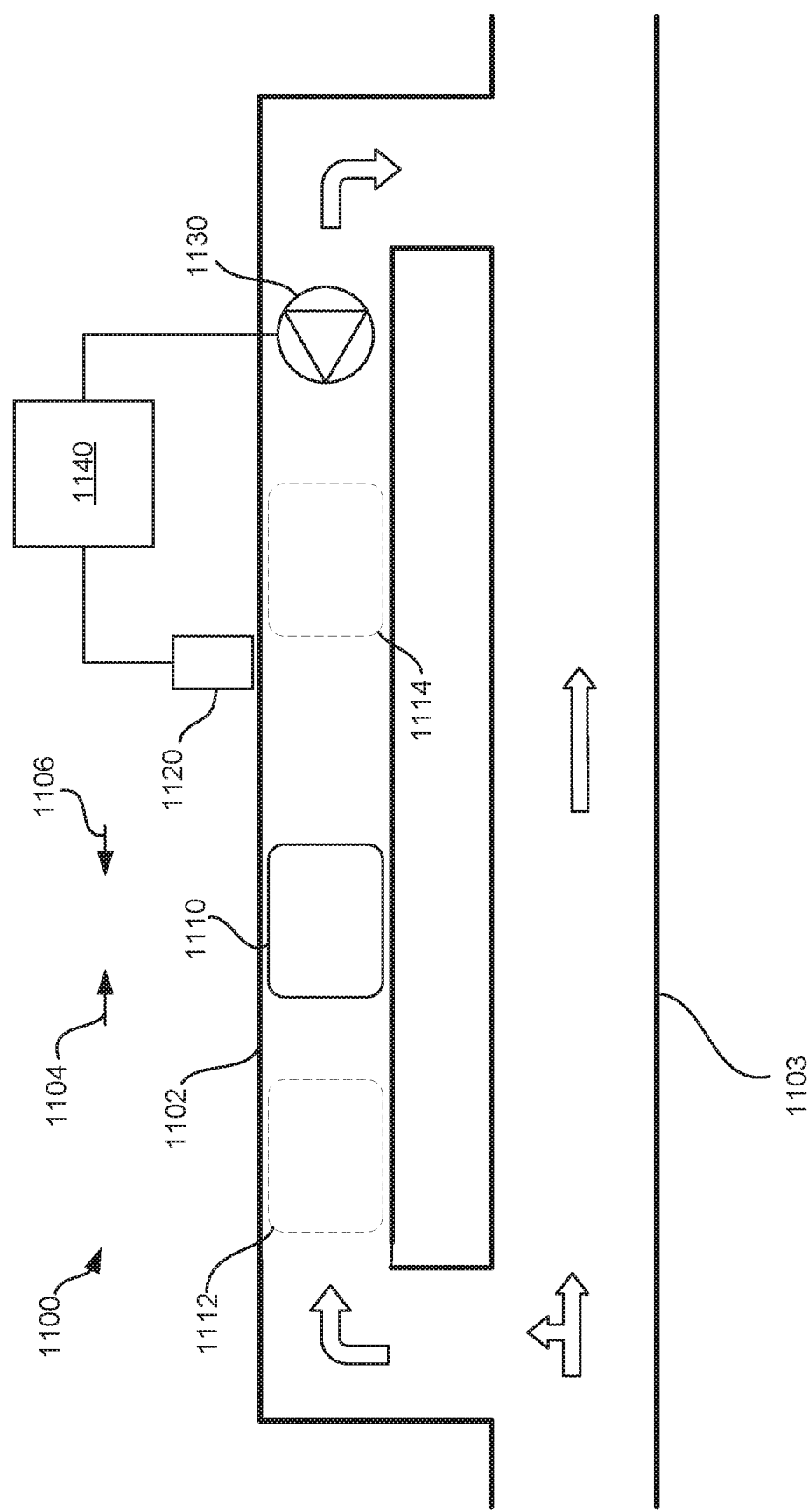
FIG. 11 is a schematic diagram of an example device that measures flow rate using a movable element, the device located at an auxiliary microfluidic channel of the microfluidic network.

FIG. 11 is a schematic diagram of an example device 1100 that measures flow rate using a movable element. The device 1100 includes a microfluidic channel 1102, a movable element 1110, a first position 1112, a second position 1114, a main flow direction 1104, a reverse flow direction 1106, a sensor 1120, a microfluidic pump 1130, and a controller 1140. For further description of the above elements of the device 1100, the description of the device 100 of FIG. 1 may be referenced. For sake of clarity, only the differences between the device 1100 and the device 100 will be described in detail.

The microfluidic channel 1102 may be an auxiliary microfluidic channel to another microfluidic channel 1103 of a microfluidic network. The device 1100 may therefore be termed a bypath sensor. The device 1100 may be used to calibrate flow meters elsewhere in the microfluidic network. Hence, the sensor 1120 may be termed a calibrating sensor.

Figure 12:
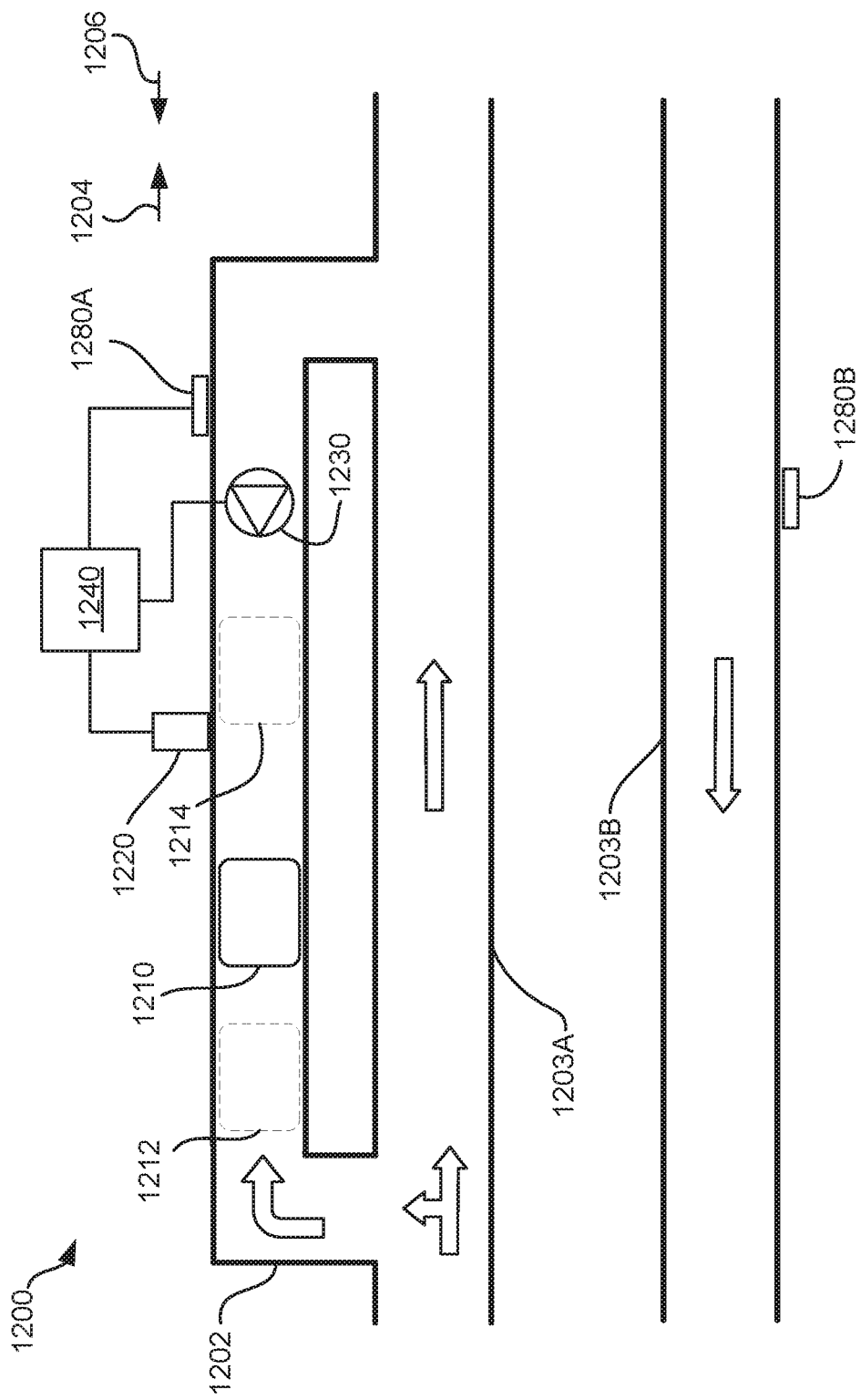
FIG. 12 is a schematic diagram of an example device that measures flow rate using a movable element, the device located at an auxiliary microfluidic channel of the microfluidic network, the device including a flow meter at an additional microfluidic channel of the microfluidic network.

FIG. 12 is a schematic diagram of an example device 1200 that measures flow rate using a movable element. The device 1200 includes a microfluidic channel 1202, a movable element 1210, a first position 1212, a second position 1214, a main flow direction 1204, a reverse flow direction 1206, a sensor 1220, a microfluidic pump 1230, and a controller 1240. For further description of the above elements of the device 1200, the description of the device 100 of FIG. 1 may be referenced. For sake of clarity, only the differences between the device 1200 and the device 100 will be described in detail.

The microfluidic channel 1202 may be an auxiliary microfluidic channel off another microfluidic channel 1203A. The microfluidic channel 1203A may be part of a microfluidic network, including other microfluidic channels, such as microfluidic channel 1203B.

The device 1200 may further include an additional sensor 1280A to take an additional sensor reading to determine a flow rate of fluid flow through the microfluidic channel 1202. The controller 1240 may calibrate the additional sensor 1280A using the flow rate determined based on the sensor reading taken by the sensor 1220. Hence, the sensor 1220 may be termed a calibrating sensor. The additional sensor 1280A may be sensitive to certain properties of the fluid being metered, and therefore may be calibrated by the device 1200 as discussed herein.

The microfluidic channel 1203B may also include an additional sensor 1280B. The additional sensors 1280A, 1280B may be sensors of the same type, and which are similarly sensitive to properties of the fluid being metered. For example, the additional sensors 1280A, 1280B, may be the same type of thermal flow meter. If the microfluidic channel 1203B carries fluid flow of the same fluid as the microfluidic channel 1203A, the additional sensor 1280B may similarly be calibrated by the device 1200 as discussed herein. If the microfluidic channel 1203B carries fluid flow of a different fluid, the additional sensor 1280B may also be calibrated using the device 1200. For example, the additional sensor 1280A may be calibrated according to a first calibration factor, and the additional sensor 1280B may be calibrated according to a second calibration factor, wherein a relationship between the first and second calibration factors is known.

Figure 13A:
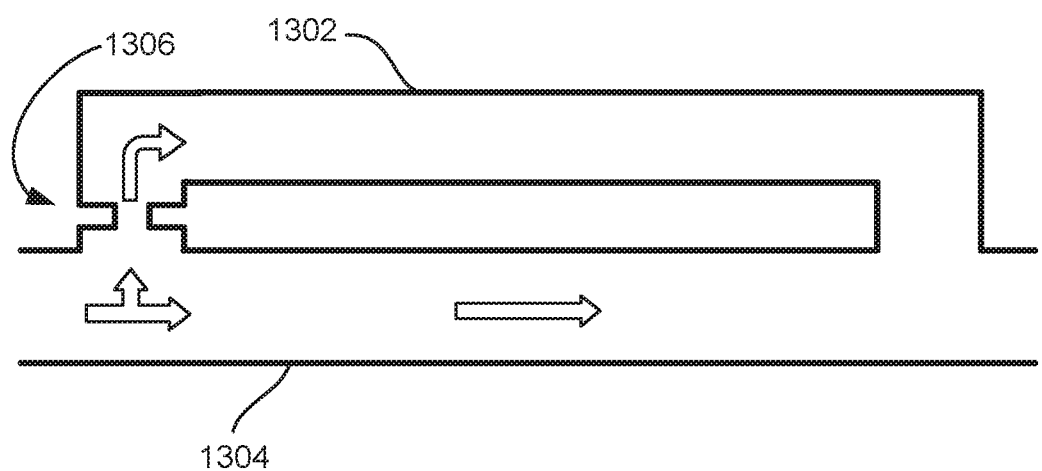
FIG. 13A is a schematic diagram of an example auxiliary microfluidic channel in fluid communication with an additional microfluidic channel of a microfluidic network, the auxiliary microfluidic channel including a pinch.

FIG. 13A is a schematic diagram of an example auxiliary microfluidic channel 1302. The auxiliary microfluidic channel 1302 may be used in devices such as the microfluidic device 1000, the device 1100, and the device 1200, but this is not intended to be limiting. The auxiliary microfluidic channel 1302 is in fluid communication with another microfluidic channel 1304. The auxiliary microfluidic channel 1302 may include a pinch 1306 to control fluid flow from the microfluidic channel 1304 into the auxiliary microfluidic channel 1302.

Figure 13B:
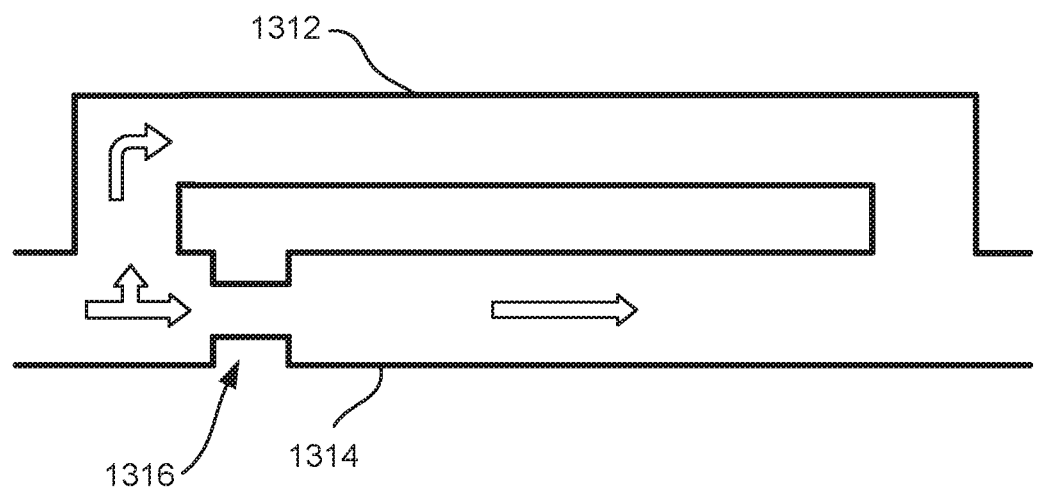
FIG. 13B is a schematic diagram of an example auxiliary microfluidic channel in fluid communication with an additional microfluidic channel of a microfluidic network, the additional microfluidic channel including a pinch.

FIG. 13B is a schematic diagram of another example auxiliary microfluidic channel 1312. The auxiliary microfluidic channel 1312 may be used in devices such as the microfluidic device 1000, the device 1100, and the device 1200, but this is not intended to be limiting. The auxiliary microfluidic channel 1312 is in fluid communication with another microfluidic channel 1314. The microfluidic channel 1314 may include a pinch 1316 to control fluid flow from the microfluidic channel 1314 into the auxiliary microfluidic channel 1312.

Figure 14:
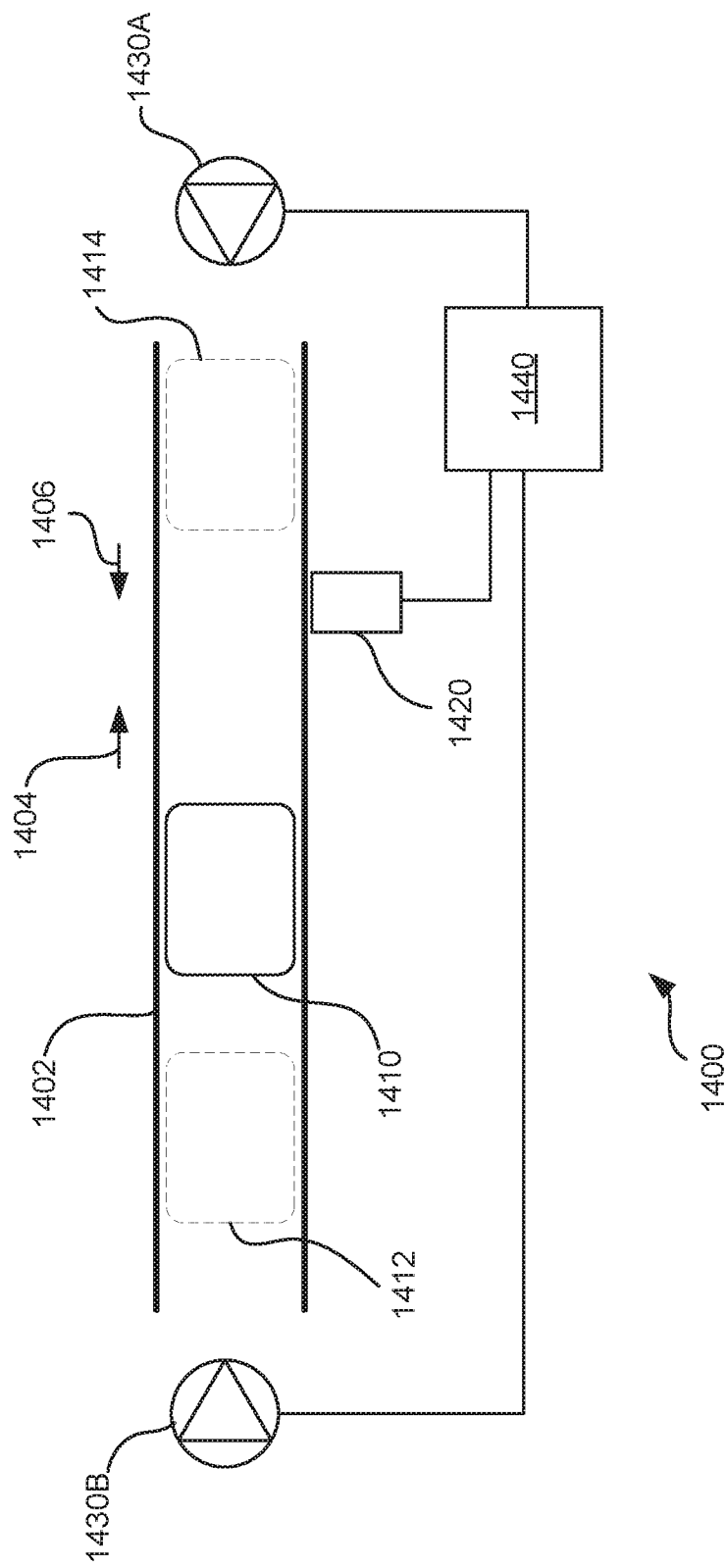
FIG. 14 is a schematic diagram of an example device that measures flow rate using a movable element, the device including two microfluidic return pumps.

FIG. 14 is a schematic diagram of an example device 1400 that measures flow rate using a movable element. The device 1400 includes a microfluidic channel 1402, a movable element 1410, a first position 1412, a second position 1414, a main flow direction 1404, a reverse flow direction 1406, a sensor 1420, a first microfluidic pump 1430A, and a controller 1440. For further description of the above elements of the device 1400, the description of the device 100 of FIG. 1 may be referenced. For sake of clarity, only the differences between the device 1400 and the device 100 will be described in detail.

The sensor 1420 may further include a second microfluidic pump 1430B to induce fluid flow in the main flow direction 1404 to move the movable element 1410 from the first position 1412 to the second position 1414. The first microfluidic pump 1430A may be used to return the movable element 1410 to the first position 1412 when the fluid flow moving through the microfluidic channel 1402 moves in the main flow direction 1404. Similarly, the second microfluidic pump 1430B may be used to return the movable element 1410 to the second position 1414 when the fluid flow moving through the microfluidic channel 1402 moves in the reverse flow direction 1406. Thus, a calibration may be made, and the movable element 1410 may be returned to a starting position for repeated calibration, whether fluid flows through the microfluidic channel 1402 in the main flow direction 1404 or in the reverse flow direction 1406. This arrangement may be useful to provide calibration in devices in which it is not known which direction fluid will flow through the microfluidic channel 1402, and in devices in which fluid flow may change from moving in the main flow direction 1404 to the reverse flow direction 1406, and vice versa.

Figure 15:
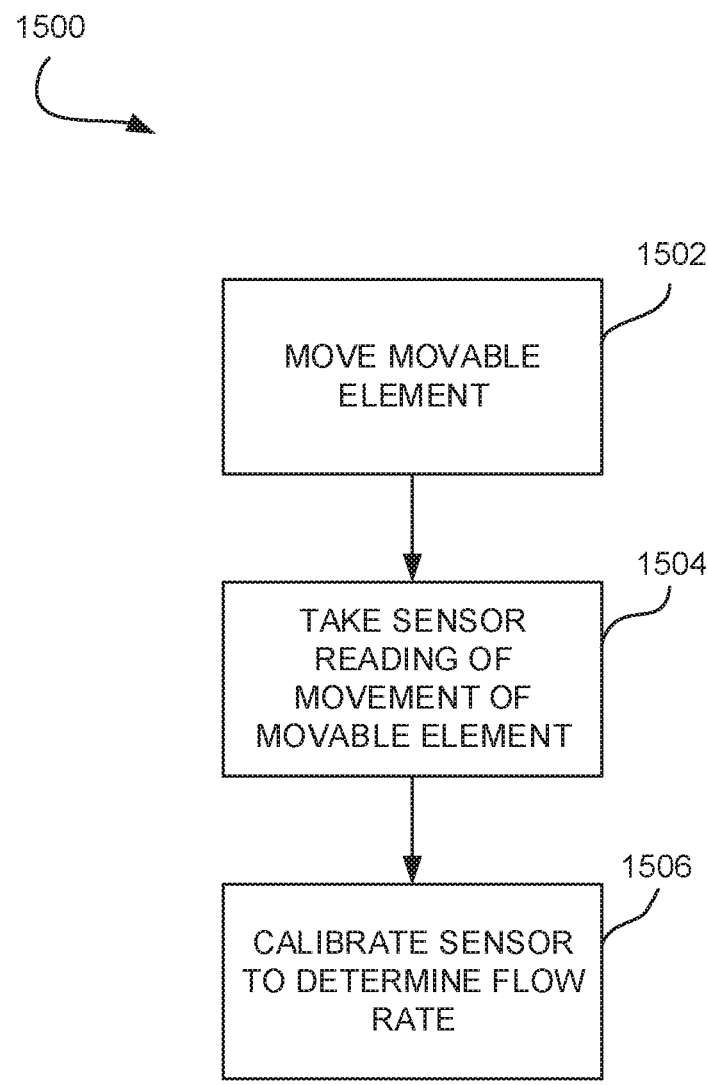
FIG. 15 is a flowchart of an example method for calibrating a sensor.

FIG. 15 is a flowchart of an example method 1500 for calibrating a sensor. The method 1500 is one way in which a sensor may be calibrated. It is to be emphasized, however, that the blocks of method 1500 need not be performed in the exact sequence shown. Further, the method 1500 may be performed by a device as described above such as device 800, 902, 912, 922, 1000, or 1200. For clarity, the method 1500 has been described with reference to the device 800, but this is not limiting, and the method may be performed by other devices.

At block 1502, a movable element 810 is moved from a first position 812 to a second position 814 in a microfluidic channel 802 by a first fluid flow through the microfluidic channel 802 in a main flow direction 804.

At block 1504, a sensor reading is taken of movement of the movable element 810 from the first position 812 to the second position 814 using a sensor 820. Taking the sensor reading may involve taking a sensor reading of a presence of the movable element 110 at a sensing position or a velocity of the movable element 810 moving through the microfluidic channel 802, or both, from which a fluid flow rate of the first fluid flow through the microfluidic channel 802 may be determined.

At block 1506, an additional sensor 880 is calibrated to determine a flow rate of a second fluid flow through the device 800 based on the sensor reading. The additional sensor 880 may be calibrated to take a sensor reading of fluid flow rate through the microfluidic channel 802 directly. In other examples, the additional sensor 880 may be calibrated to take a sensor reading of fluid flow rate through another channel elsewhere in the device 800 (e.g., see the additional sensors 1280A, 1280B of the device 1200 of FIG. 12).

In some examples, the first fluid flow through the microfluidic channel 802 is the same as the second fluid flow through the device 800, whereby the additional sensor 880 takes a sensor reading of the same fluid flow as the sensor 820. In other examples, the second fluid flow may be subsequent to the first fluid flow.

In some examples, the method 1500 may involve returning the movable element 810 to the first position 812 by fluid flow induced by a microfluidic pump in a reverse flow direction 806. Thus, additional calibrations of the sensor 880 may be made.

Figure 16:
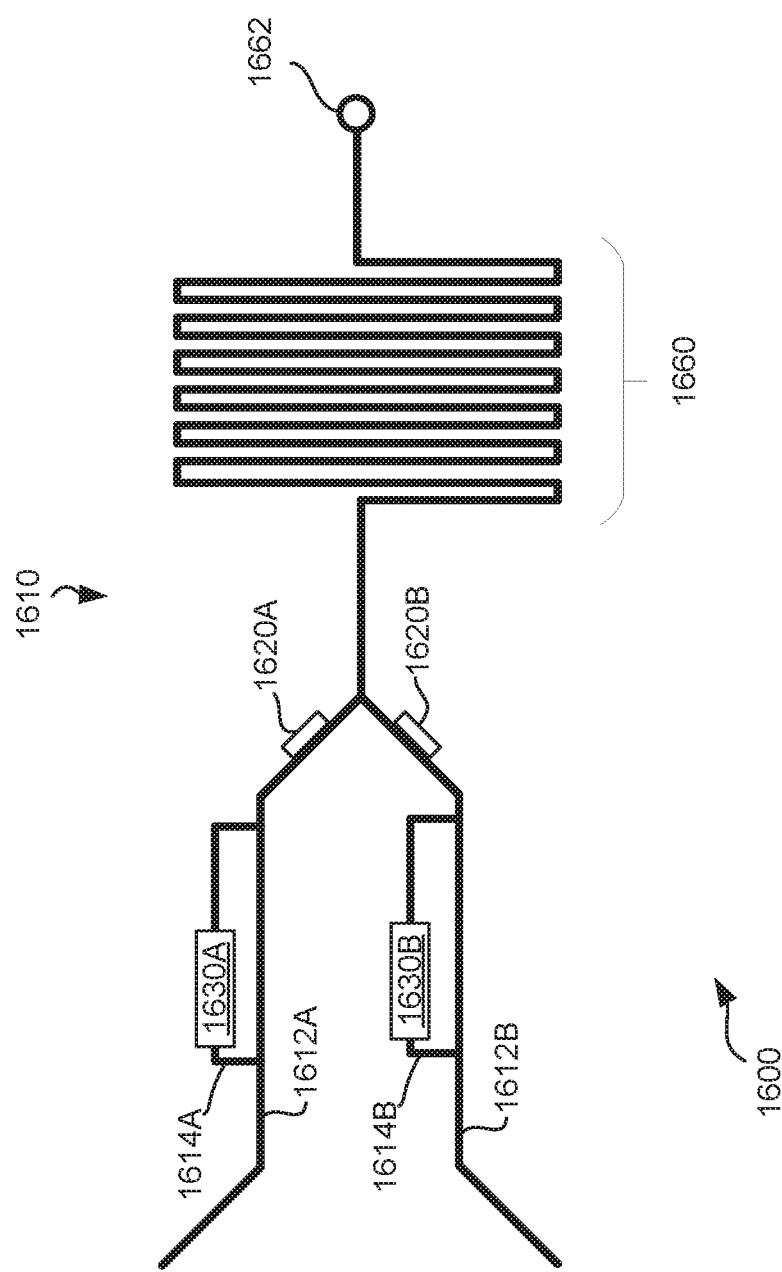
FIG. 16 is a schematic diagram of an example microfluidic device showing a microfluidic network including flow meters, auxiliary microfluidic channels, and a mixing volume for mixing with calibrated flow based on a movable element.

FIG. 16 is a schematic diagram of an example microfluidic device 1600 that may be used in applications such as reactant mixing and water droplet generation. The microfluidic device 1600 includes a microfluidic network 1610. The microfluidic network 1610 includes microfluidic channels 1612A, 1612B and may include a downstream volume, such as a mixing volume 1660, that proceeds to an output 1662. The microfluidic channels 1612A, 1612B each provide fluids to be mixed in mixing volume 1660. The mixing volume 1660 may include a serpentine mixing channel, a zig-zag channel, a twisted channel, a t- or y-shaped micro-mixer, a lamination mixer, or another passive micro-mixer. It is contemplated that active micro-mixers may also be used.

The microfluidic device 1600 further includes an auxiliary microfluidic channel 1614A in parallel with the microfluidic channel 1612A. A calibration device 1630A is located at the auxiliary microfluidic channel 1614A. The calibration device 1630A may include a device that measures flow rate using a movable element, such as those described herein.

A flow meter 1620A is also located along the microfluidic channel 1612A to measure a fluid flow rate through the microfluidic channel 1612A, and may be calibrated using the calibration device 1630A, as described herein.

Similarly, the microfluidic device 1600 further includes an auxiliary microfluidic channel 1614B in parallel with the microfluidic channel 1612B. A calibration device 1630B is located at the auxiliary microfluidic channel 1614B. The calibration device 1630B may include a device that measures flow rate using a movable element, such as those described herein.

A flow meter 1620B is also located along the microfluidic channel 1612B to measure a fluid flow rate through the microfluidic channel 1612B, and may be calibrated using the calibration device 1630B, as described herein.

The flow meters 1620A, 1620B may include sensors, such as thermal flow meters, which are sensitive to properties of the fluid being metered and thus may be calibrated using the calibration devices 1630A, 1630B, as described herein, to be accurate despite fluid properties.

A particularly suitable application of the microfluidic device 1600 is a water droplet generator, which is highly sensitive to flow rates of water and oil. In water droplet generation, water flows through the microfluidic channel 1612A and oil flows through the microfluidic channel 1612B to generate water droplets in oil at output 1662. As measured flow rates are sensitive to fluid properties and as the properties of water and oil differ significantly, the separate calibration devices 1630A, 1630B are particularly useful. In other applications, where fluid properties differ to a lesser degree, then one of the calibration devices 1630A, 1630B may be used to calibrate both flow meters 1620A, 1620B and the other calibration device 1630A, 1630B may be omitted.

Another example application of the microfluidic device 1600 is on-the-fly ink mixing for inkjet printing. A microfluidic channel 1612A may deliver ink with a stable dispersion (e.g., non-agglomerated ink) and a microfluidic channel 1612B may deliver a destabilizer to cause the ink to agglomerate just prior to being delivered to an output 1662, which may include or lead to an inkjet nozzle. The separate calibration devices 1630A, 1630B may be used to calibrate the flow meters 1620A, 1620B to provide for accurate flow of ink and destabilizer. This may improve print quality in cases where an agglomerated ink is subject to degrading over time, as the destabilizer may be mixed with the ink just prior to printing.

Other applications include microfluidic-based flow chemistry reactors and bio-reactors, where reactants flow through the microfluidic channels 1612A, 1612B, to be mixed and reacted in mixing volume 1660, where reactions are sensitive to reactant flow rates, and where measured reactant flow rates are sensitive to fluid properties.

Figure 17:
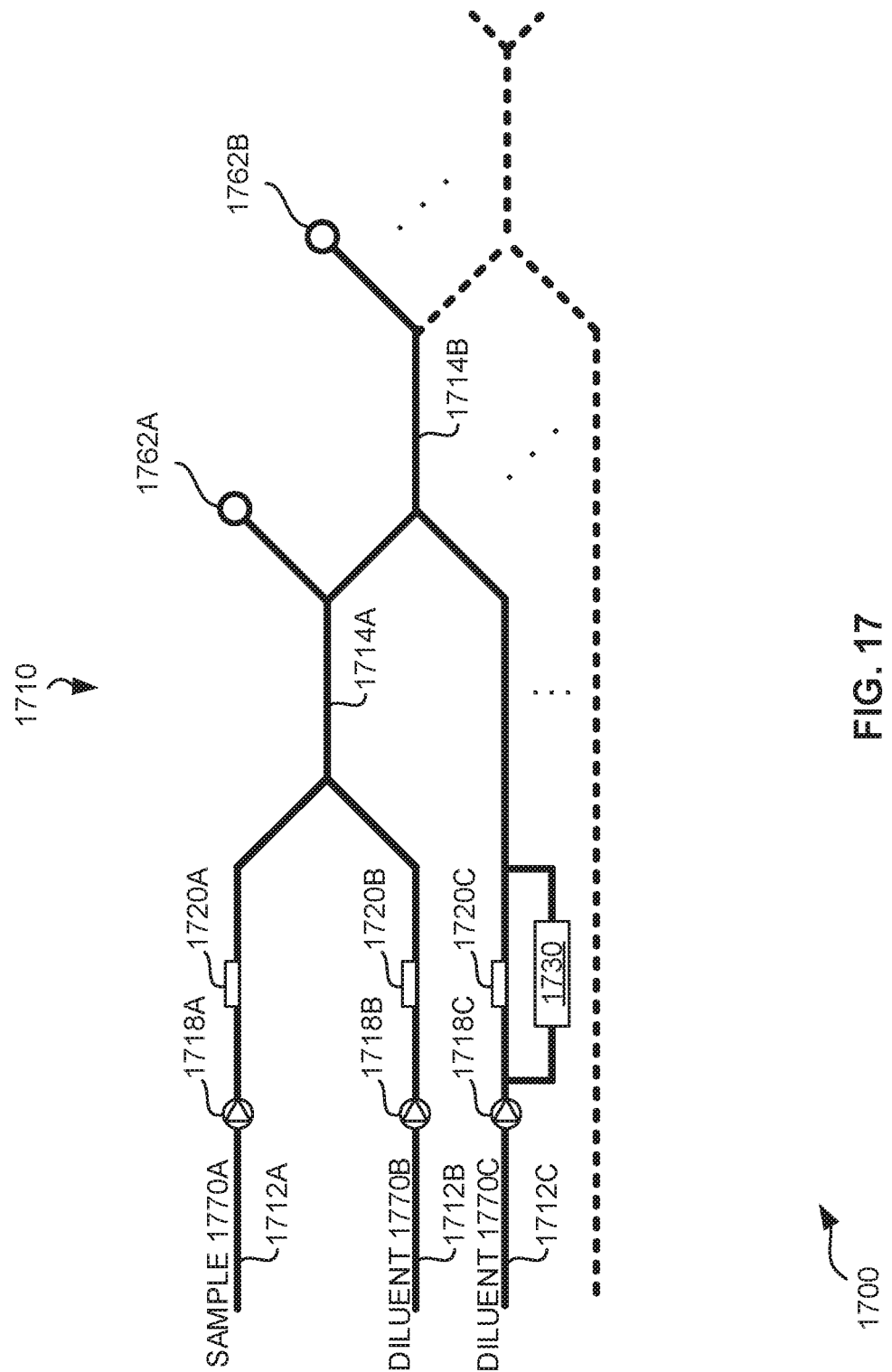
FIG. 17 is a schematic diagram of an example microfluidic device for dilution with calibrated flow based on a movable element.

FIG. 17 is a schematic diagram of an example microfluidic device 1700 that may be used in applications such as sample dilution. In polymerase chain reaction (PCR) processes and similar DNA/RNA amplification processes it is often desirable to dilute a sample. For example, in a realtime FOR (RT-PCR) standard curve methodology of quantification, serial dilutions, such by a factor of 2 5, or 10, are used.

The microfluidic device 1700 includes a microfluidic network 1710 of converging and diverging channels. A first input microfluidic channel 1712A joins a second input microfluidic channel 1712B to feed a first combined microfluidic channel 1714A. The first combined channel 1714A splits to a first output 1762A and to join a third input microfluidic channel 1712C to feed a second combined microfluidic channel 1714B. The second combined microfluidic channel 1714B feeds a second output 1762B. This pattern may be repeated to any degree.

Each input channel 1712A, 1712B, 1712C includes a respective microfluidic pump 1718A, 1718B, 1718C to provide controllable flow of fluid to the input channel 1712A, 1712B, 1712C.

Each input channel 1712A, 1712B, 1712C includes a respective flow meter 1720A, 1720B, 1720C to measure respective fluid flow rates. The flow meters 1720A, 1720B, 1720C may include sensors, such as thermal flow meters, which are sensitive to properties of the fluid being metered and thus may be calibrated using a calibration device 1730 that uses a moveable element, as described herein, to be accurate despite fluid properties. The calibration device 1730 may be provided, for example, in an auxiliary channel parallel with one of the input channels 1712A, 1712B, 1712C.

A nucleic acid sample 1770A and diluents 1770B, 1770C are provided to the input channels 1712A, 1712B, 1712C, respectively. The flow rates of the diluents 1770B, 1770C may be controlled to provide desired serial dilutions at outputs 1762A, 1762B. For example, the microfluidic pumps 1718A, 1718B, 1718C may be controlled to provide a ratio of flow of diluent 1770B to sample 1770A of 9:1 and a ratio of flow of diluent 17700 to combined flow at first combined channel 1714A of 9:1, such that first output 1762A yields a 10-fold dilution of the nucleic acid sample 1770A and second output 1762B yields a 100-fold dilution of the nucleic acid sample 1770A. The flow meters 1720A, 1720B, 1720C are used to control the microfluidic pumps 1718A, 1718B, 1718B. The flow meters 1720A, 1720B, 1720C are calibrated by the calibration device 1730, as described herein. As fluid properties of the diluents 1770B, 1770C are the same and are similar to fluid properties of the nucleic acid sample 1770A, one calibration device 1730 is sufficient to provide accurate dilutions.

Figure 18:
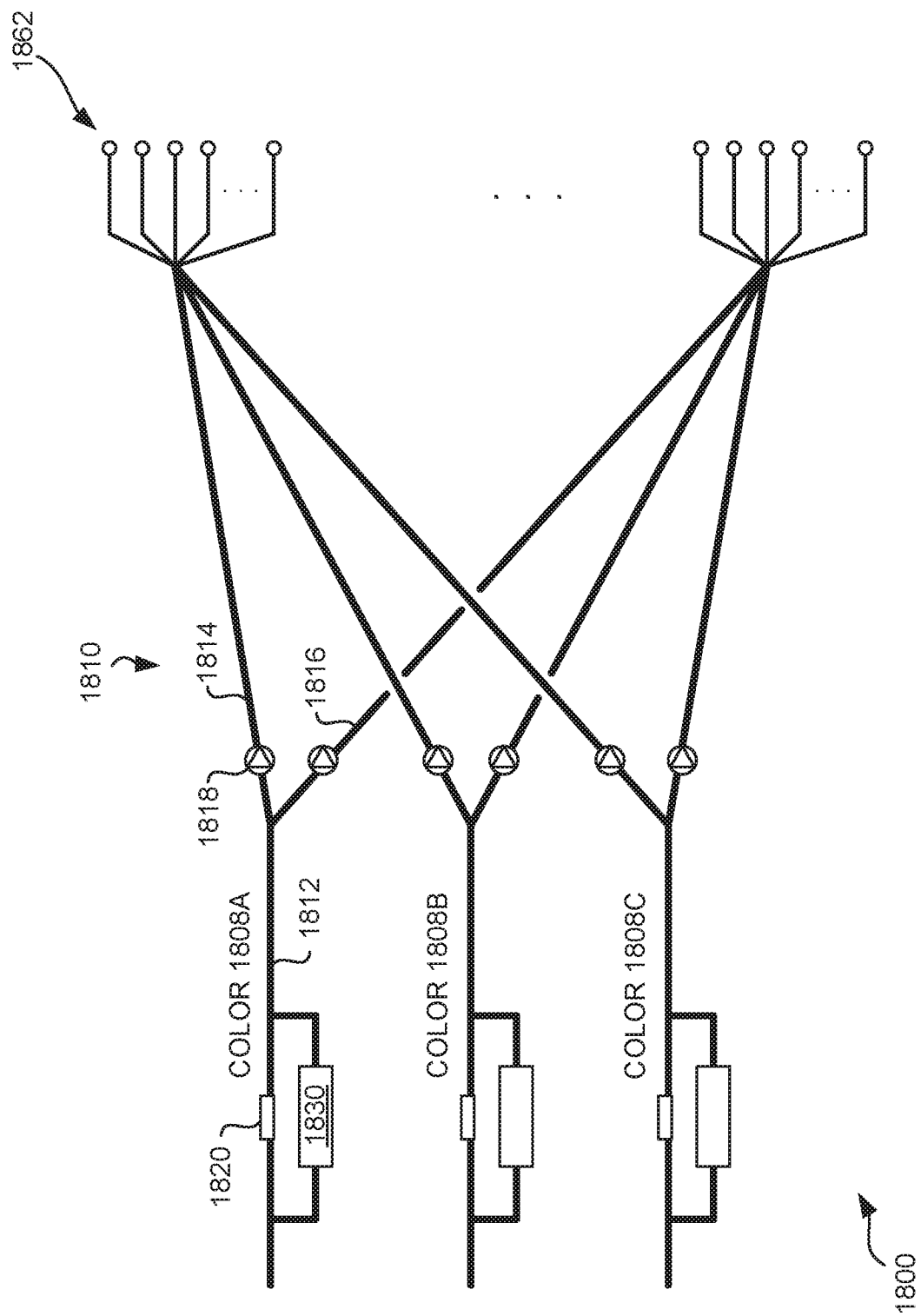
FIG. 18 is a schematic diagram of an example microfluidic device for ink color mixing with calibrated flow based on a movable element.

FIG. 18 is a schematic diagram of an example microfluidic device 1800 that may be used in printing applications to mix ink color on demand. The device 1800 includes a microfluidic network 1810 having three converging subnetworks for three different colors 1808A, 1808B, 1808C of ink, such as cyan, yellow, and magenta. The subnetworks converge at a plurality of banks of inject nozzles 1862.

Each subnetwork includes a main ink channel 1812 that branches to each bank of inject nozzles 1862 via branching channels 1814, 1816. Each branching channel 1814, 1816 includes a microfluidic pump 1818 or similar flow control device. As such, flow of each color 1808A, 1808B, 1808C of ink may be regulated and ink may be controllably mixed to obtain a desired color at each bank of inject nozzles 1862. Delivery of each color 1808A, 1808B, 1808C of ink may be accurately controlled to provide for accurate color rendition to printed media via flow meter 1820 disposed in each main ink channel 1812.

The flow meter 1820 may include a sensor, such as thermal flow meter, which is sensitive to properties of the ink being metered and thus may be calibrated using a calibration device 1830 that uses a moveable element, as described herein, to be accurate despite fluid properties. The calibration device 1730 may be provided, for example, in an auxiliary channel parallel with the main ink channel 1812.

Other applications include devices which prepare unstable chemical mixtures from stable reactants, where stability is sensitive to variations in the reactants concentrations. Other applications include devices which prepare fluids with target physical and/or chemical properties, such as devices which prepare a fluid with a target pH from fluids with different pH levels. Other applications include devices that dilute an input sample at a high degree of precision, such as a in the preparation of a dilution series of an analyte. In such applications, operation of the device may be sensitive to fluid flow rates, and measured fluid flow rates may be sensitive to fluid properties.

It should be apparent from the above that a device may measure flow rate using a movable element. The device may include a microfluidic channel, a movable element retained in the microfluidic channel, and a sensor and controller to determine a flow rate through the microfluidic channel based on movement of the movable element. Movement of the movable element, and therefore sensor readings related thereto, may be minimally impacted by properties of the fluid flowing through the microfluidic channel. Thus, the device may be used to calibrate other sensor devices, such as other flow meters, which may be sensitive to properties of fluids. The device may be single-use, or a return mechanism may allow the device to be reused. Using the return mechanism, the device may be used to calibrate, periodically or on demand, other sensors or flow meters. Moreover, flow rate may be measured without undesirable interference with the fluid by particles or electromagnetism.

The scope of the claims should not be limited by the above examples, but should be given the broadest interpretation consistent with the description as a whole.

The invention claimed is:

1. A device comprising:
a microfluidic channel;
a movable element retained in the microfluidic channel to move from a first position to a second position by fluid flow through the microfluidic channel;
a sensor to take a sensor reading of a presence of the movable element at a sensing position or a velocity of the fluid flow through the microfluidic channel;
a microfluidic pump to return the movable element from the second position to the first position; and
a controller to actuate the microfluidic pump, and to determine a flow rate of the fluid flow through the microfluidic channel based on the sensor reading.

2. The device of claim 1, wherein the sensor comprises a first position sensor to determine a presence of the movable element at the first position, and wherein the device further comprises a second position sensor to determine a presence of the movable element at the second position.

3. The device of claim 1, further comprising a first stopper element and a second stopper element, wherein the first and second stopper elements cooperate to bound the movable element between the first position and the second position.

4. The device of claim 3, wherein the first stopper element or the second stopper element comprises a pillar disposed in the microfluidic channel.

5. The device of claim 3, wherein the first stopper element or the second stopper element comprises a notch in a side wall of the microfluidic channel.

6. The device of claim 1, wherein the microfluidic channel comprises a parking chamber, the device further comprises a parking element disposed in the parking chamber to guide the movable element toward the second position, and a cross-section of the microfluidic channel at the parking chamber is greater than a cross-section of the microfluidic channel at the first position.

7. The device of claim 1, wherein the microfluidic pump comprises a rear end oriented away from the first position and the second position, and the device further comprises a reservoir chamber adjacent to the rear end of the microfluidic pump.

8. The device of claim 1, further comprising an additional sensor to determine a flow rate of the fluid flow through the microfluidic channel, wherein the controller is to calibrate the additional sensor based on the sensor reading.

9. The device of claim 8, wherein the microfluidic channel is part of a microfluidic network, and the sensor and the additional sensor are of a same type.

10. A device comprising:
a microfluidic network;
an auxiliary microfluidic channel in the microfluidic network;
an additional microfluidic channel in the microfluidic network;
a movable element retained in the auxiliary microfluidic channel to move from a first position to a second position by fluid flow through the auxiliary microfluidic channel;
a calibrating sensor to determine a flow rate of fluid flow through the auxiliary microfluidic channel based on movement of the movable element from the first position to the second position;
an additional sensor to determine another flow rate of fluid flow through the additional microfluidic channel; and
a controller to calibrate the additional sensor using the calibrating sensor.

11. The device of claim 10, wherein the additional sensor comprises a thermal flow meter.

12. The device of claim 11, wherein the auxiliary microfluidic channel is in fluid communication with the additional microfluidic channel of the microfluidic network, and wherein the auxiliary microfluidic channel comprises a pinch to control fluid flow from the additional microfluidic channel to the auxiliary microfluidic channel.

13. The device of claim 10, wherein the auxiliary microfluidic channel is in fluid communication with the additional microfluidic channel of the microfluidic network, and wherein the additional microfluidic channel comprises a pinch to control fluid flow from the additional microfluidic channel to the auxiliary microfluidic channel.

14. A method comprising:
moving a movable element from a first position to a second position in a microfluidic channel of a device by a first fluid flow through the microfluidic channel in a main flow direction;
taking a sensor reading of movement of the movable element from the first position to the second position using a first sensor; and
calibrating a second sensor to determine a flow rate of a second fluid flow through the device based on the sensor reading.

15. The method of claim 14, further comprising returning the movable element to the first position by fluid flow induced by a microfluidic pump in a reverse flow direction.

* * * * *